United States Patent
Choi et al.

(10) Patent No.: US 12,439,027 B2
(45) Date of Patent: Oct. 7, 2025

(54) APPARATUSES FOR ENCODING AND DECODING IMAGE, AND METHODS FOR ENCODING AND DECODING IMAGE THEREBY

(71) Applicant: SAMSUNG ELECTRONICS CO., LTD., Suwon-si (KR)

(72) Inventors: Woongil Choi, Suwon-si (KR); Minsoo Park, Suwon-si (KR); Minwoo Park, Suwon-si (KR); Seungsoo Jeong, Suwon-si (KR); Kiho Choi, Suwon-si (KR); Narae Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 17/434,657

(22) PCT Filed: Feb. 28, 2020

(86) PCT No.: PCT/KR2020/002924
§ 371 (c)(1),
(2) Date: Mar. 7, 2022

(87) PCT Pub. No.: WO2020/175967
PCT Pub. Date: Sep. 3, 2020

(65) Prior Publication Data
US 2023/0103665 A1    Apr. 6, 2023

Related U.S. Application Data

(60) Provisional application No. 62/811,764, filed on Feb. 28, 2019.

(51) Int. Cl.
*H04N 19/105* (2014.01)
*H04N 19/176* (2014.01)
*H04N 19/30* (2014.01)

(52) U.S. Cl.
CPC ......... *H04N 19/105* (2014.11); *H04N 19/176* (2014.11); *H04N 19/30* (2014.11)

(58) Field of Classification Search
CPC .... H04N 19/105; H04N 19/176; H04N 19/30; H04N 19/463; H04N 19/573;
(Continued)

(56) References Cited

U.S. PATENT DOCUMENTS

| 9,167,248 | B2 | 10/2015 | Chen et al. |
| 9,762,910 | B2 | 9/2017 | Lee et al. |

(Continued)

FOREIGN PATENT DOCUMENTS

| CN | 104160706 A | 11/2014 |
| CN | 105453564 A | 3/2016 |

(Continued)

OTHER PUBLICATIONS

International Search Report (PCT/ISA/210) dated Jun. 9, 2020 issued by the International Searching Authority in International Application No. PCT/KR2020/002924.

(Continued)

*Primary Examiner* — Joseph W Becker
(74) *Attorney, Agent, or Firm* — Sughrue Mion, PLLC

(57) ABSTRACT

An image decoding method may include: obtaining, from a sequence parameter set of a bitstream, information indicating a plurality of first reference image lists for an image sequence including a current image; obtaining, from a group header of the bitstream, an indicator for a current block group including a current block in the current image; obtaining a second reference image list by modifying a first (Continued)

2910

| Index | Type | POC-RELATED VALUE |
|---|---|---|
| 0 | Short-term | Delta = −1 |
| 1 | Short-term | Delta = −3 |
| 2 | Short-term | Delta = −4 |

2920

| Index | Type | POC-RELATED VALUE |
|---|---|---|
| 0 | Long-term | LSB = 8 |
| 1 | Long-term | LSB = 10 |

2930

| Index | Type | POC-RELATED VALUE |
|---|---|---|
| 0 | Short-term | Delta = −1 |
| 1 | Short-term | Delta = −3 |
| 2 | Short-term | Delta = −4 |
| 3 | Long-term | LSB = 8 |
| 4 | Long-term | LSB = 10 | reference image list indicated by the indicator, from among the plurality of first reference image lists, into the second reference image list; and prediction-decoding a lower block of the current block based on a second reference image included in the second reference image list.

4 Claims, 34 Drawing Sheets

(58) Field of Classification Search
CPC ...... H04N 19/58; H04N 19/61; H04N 19/186; H04N 19/70; H04N 19/85
See application file for complete search history.

(56) References Cited

U.S. PATENT DOCUMENTS

| | | | |
|---|---|---|---|
| 9,973,749 | B2 | 5/2018 | Hannuksela et al. |
| 9,998,757 | B2 | 6/2018 | Chen et al. |
| 10,687,053 | B2 | 6/2020 | Jun et al. |
| 2013/0114710 | A1 | 5/2013 | Park et al. |
| 2013/0329787 | A1 | 12/2013 | Ramasubramonian et al. |
| 2014/0016699 | A1 | 1/2014 | Chen et al. |
| 2016/0100189 | A1 | 4/2016 | Pang et al. |
| 2016/0241835 | A1 | 8/2016 | Ikai et al. |
| 2017/0034508 | A1 | 2/2017 | Xiu et al. |
| 2017/0214938 | A1* | 7/2017 | Zhang .................. H04N 19/177 |
| 2018/0160113 | A1 | 6/2018 | Jeong et al. |
| 2018/0176596 | A1 | 6/2018 | Jeong et al. |
| 2018/0367782 | A1 | 12/2018 | Ikai et al. |
| 2018/0367806 | A1 | 12/2018 | Mochizuki et al. |
| 2019/0246103 | A1 | 8/2019 | Jun et al. |
| 2020/0021801 | A1 | 1/2020 | Jeong et al. |
| 2021/0185353 | A1* | 6/2021 | Xiu ...................... H04N 19/583 |

FOREIGN PATENT DOCUMENTS

| | | | |
|---|---|---|---|
| CN | 106797476 | A | 5/2017 |
| CN | 107027031 | A | 8/2017 |
| CN | 108141604 | A | 6/2018 |
| CN | 108353166 | A | 7/2018 |
| EP | 3 242 481 | A1 | 8/2017 |
| EP | 3 367 684 | A1 | 8/2018 |
| KR | 10-2013-0050863 | A | 5/2013 |
| KR | 10-2017-0142866 | A | 12/2017 |
| KR | 1020180032549 | A | 3/2018 |
| KR | 1020180037583 | A | 4/2018 |
| KR | 1020180063033 | A | 6/2018 |
| KR | 1020180080166 | A | 7/2018 |

OTHER PUBLICATIONS

European Search Report, dated Nov. 3, 2022, issued by the European Patent Office, in App No. 20763453.6.
"Description of video coding technology proposal by Samsung, Huawei, and Qualcomm for New Video Coding Standard," dated Jan. 13, 2019, No. m46354, XP030214983 (Total 166 pages) URL: URL:http://phenix.int-evry.fr/mpeg/doc_end_user/documents/125_Marrakech/wgII/m46354-v5-m46354.zipMPEG-new-video-codec-draft-text_Baseline_Main_description.docx.
Ye-Kui Wang et al., "On reference picture management for VVC," JVET-M0128-vl, dated Jan. 2, 2019, No. JVET-M0128, XP030200190 (9 total pages) URL:http://phenix.int-evry.fr/jvet/doc_end_user/documents/13_Marrakech/wgII/JVET-M0128-vl.zip JVET-M0128-vl.docx.
Communication issued Oct. 27, 2023 by the Intellectual Property Office of India in Indian Patent Application No. 202147041500.
Office Action issued on Jan. 25, 2024 by the Chinese Patent Office in corresponding CN Patent Application No. 202080017337.7.
Communication dated Jun. 22, 2024, issued by the National Intellectual Property Administration, PRC in Chinese Application No. 202080017337.7.
Communication dated Jul. 8, 2024, issued by the European Patent Office in European Application No. 20763453.6.
Communication dated Jul. 18, 2024, issued by the Mexican Institute of Industrial Property (IMPI) in Mexican Application No. MX/a/2021/010368.
Communication dated Sep. 4, 2024, issued by the Korean Intellectual Property Office in Korean Patent Application No. 10-2021-7027776.
Communication dated Sep. 24, 2024, issued by the National Intellectual Property Administration, PRC in counterpart Chinese Application No. 202080017337.7.
Fangjun PU et al., "CE12-4: SDR In-loop Reshaping," Joint Video Experts Team (JVET) of ITU-T SG 16 WP 3 and ISO/IEC JTC 1/SC 29/WG 11, Document: JVET-L0246-v2, Oct. 2018, total 9 pages.
Taoran LU et al., "CE12-related: Universal low complexity reshaper for SDR and HDR video," Joint Video Experts Team (JVET) of ITU-T SG 16 WP 3 and ISO/IEC JTC 1/SC 29/WG 11, Document: JVET-L0247-v2, Oct. 2018, total 10 pages.
Communication issued on Sep. 9, 2024 by the Intellectual Property Office of Vietnam in corresponding Vietnamese Application No. 1-2021-05761.
Communication issued Mar. 1, 2025 from the China National Intellectual Property Administration for Chinese Application No. 202080017337.7.
Communication issued Dec. 17, 2024 from the China National Intellectual Property Administration for Chinese Application No. 202080017337.7.
Communication issued Feb. 3, 2025 from the European Patent Office for European Application No. 24211146.6.
Benjamin Bross et al., "Versatile Video Coding (Draft 5)", Document: JVET-N1001-v10 (Jul. 7, 2019), Joint Video Experts Team (JVET) of ITU-T SG 16 WP 3 and ISO/IEC JTC 1/SC 29/WG 11, 14th Meeting: Geneva, Mar. 2019, 406 pages, XP030222340.
Ye-Kui Wang et al., "AHG17: Signalling of reshaper parameters in APS", Document: JVET-N0117-v1 (Mar. 12, 2019), Joint Video Experts Team (JVET) of ITU-T SG 16 WP 3 and ISO/IEC JTC 1/SC 29/WG 11, 14th Meeting: Geneva, Mar. 2019, 7 pages, XP030202641.
Office Action dated May 2, 2025, issued by Indonesian Patent Office in Indonesian Patent Application No. P00202107923.

* cited by examiner

FIG. 13

| BLOCK SHAPE<br>DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 17
| SQUARE BLOCK | |
|---|---|
| (00)b |  |
| (01)b |  |
| (10)b |  |
| (11)b |  |
| NON-SQUARE BLOCK | |
|---|---|
| (0)b |  |
| (10)b |  |
| (11)b |  |

FIG. 18

| SQUARE BLOCK | |
|---|---|
| (00)b | □ |
| (10)b | ▭ |
| (11)b | ▯ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

| Index | Type | POC-RELATED VALUE |
|---|---|---|
| 0 | Short-term | Delta = −1 |
| 1 | Long-term | LSB = 10 |
| 2 | Short-term | Delta = −3 |

2520

| Index | Type | POC-RELATED VALUE |
|---|---|---|
| 0 | Long-term | LSB = 6 |
| 1 | Long-term | LSB = 12 |
| 2 | Short-term | Delta = −1 |

2530

| Index | Type | POC-RELATED VALUE |
|---|---|---|
| 0 | Short-term | Delta = −1 |
| 1 | Short-term | Delta = −3 |
| 2 | Short-term | Delta = −4 |

FIG. 26

| Index | Type | POC-RELATED VALUE | |
|---|---|---|---|
| 0 | Short-term | Delta = −1 | 2510 |
| 1 | Long-term | LSB = 10 | |
| 2 | Short-term | Delta = −3 | |

⇩

| Index | Type | POC-RELATED VALUE | |
|---|---|---|---|
| 0 | Short-term | Delta = −2 | 2600 |
| 1 | Long-term | LSB = 8 | |
| 2 | Short-term | Delta = −5 | |

| Index | Type | POC-RELATED VALUE |
|---|---|---|
| 0 | Short-term | Delta = −1 |
| 1 | Long-term | LSB = 10 |
| 2 | Short-term | Delta = −3 |

2800

| Index | Type | POC-RELATED VALUE |
|---|---|---|
| 0 | Short-term | Delta = −3 |
| 1 | Short-term | Delta = −1 |
| 2 | Long-term | LSB = 10 |

| Index | Type | POC-RELATED VALUE |
|---|---|---|
| 0 | Short-term | Delta = −1 |
| 1 | Short-term | Delta = −3 |
| 2 | Short-term | Delta = −4 |

3010

| Index | Type | POC-RELATED VALUE |
|---|---|---|
| 0 | Short-term | Delta = −1 |
| 1 | Short-term | Delta = −3 |
| 2 | Short-term | Delta = −4 |
| 3 | Long-term | LSB = 8 |
| 4 | Long-term | LSB = 10 |

3030

APPARATUSES FOR ENCODING AND DECODING IMAGE, AND METHODS FOR ENCODING AND DECODING IMAGE THEREBY

CROSS-REFERENCE TO RELATED APPLICATIONS

This application is a national phase application of International Application No. PCT/KR2020/002924 filed on Feb. 28, 2020, which claims priority to U.S. Provisional Application No. 62/811,764 filed on Feb. 28, 2019, in the United States Patent and Trademark Office, the disclosures of which are incorporated herein by reference in their entireties.

BACKGROUND

1. Field

The present disclosure relates to image encoding and decoding. More particularly, the present disclosure relates to a method and an apparatus for encoding an image and a method and an apparatus for decoding the image, by using a hierarchical structure of the image.

2. Description of Related Art

In image encoding and decoding, an image may be split into blocks, and each block may be prediction-encoded and prediction-decoded via inter-prediction or intra-prediction.

Inter-prediction is a method of compressing images by removing temporal redundancy between the images, and a representative example of inter-prediction is motion estimation encoding. In motion estimation encoding, blocks of a current image are predicted by using at least one reference image. A reference block most similar to a current block may be searched for in a predetermined search range by using a predetermined evaluation function. The current block is predicted based on the reference block, and a prediction block generated as a result of the prediction is subtracted from the current block to generate and encode a residual block. Here, to more accurately perform prediction, pixels of a sub pixel (sub-pel) unit that is smaller than an integer pixel (integer-pel) unit may be generated by performing interpolation on a reference image, and inter-prediction may be performed based on the pixels of the sub-pel unit.

In codecs such as H.264 advanced video coding (AVC) and high efficiency video coding (HEVC), in order to predict a motion vector of a current block, a motion vector of previously encoded blocks which are adjacent to the current block or blocks included in a previously encoded picture is used as a prediction motion vector of the current block. A differential motion vector, which represents a difference between the motion vector and the prediction motion vector of the current block, is signaled to a decoder by using a predetermined method.

SUMMARY

A technical objective of image encoding and decoding apparatuses and image encoding and decoding methods according to an embodiment, is to encode and decode an image at a low bit rate by using a hierarchical structure of the image.

According to an aspect of the disclosure, there is provided an image decoding method including: obtaining, from a sequence parameter set of a bitstream, information indicating a plurality of first reference image lists for an image sequence including a current image; obtaining, from a group header of the bitstream, an indicator for a current block group including a current block in the current image; obtaining a second reference image list by modifying a first reference image list indicated by the indicator, from among the plurality of first reference image lists, into the second reference image list; and prediction-decoding a lower block of the current block based on a second reference image included in the second reference image list.

The image decoding method may further include: based on another first reference image list other than the first reference image list indicated by the indicator from among the plurality of first reference image lists, and the second reference image list, prediction-decoding lower blocks included in a next block group in the current image.

The first reference image list indicated by the indicator may include only a first type of reference image. The obtaining of the second reference image list may include modifying the first reference image list indicated by the indicator into the second reference image list by adding, to the first reference image list indicated by the indicator, a second type of reference image indicated by a picture order count (POC)-related value obtained from the group header.

The obtaining of the second reference image list may include modifying the first reference image list indicated by the indicator into the second reference image list by changing an order of one or more of first reference images included in the first reference image list indicated by the indicator.

The first reference image list indicated by the indicator may include a first type of reference image and a second type of reference image. The obtaining of the second reference image list may include obtaining the second reference image list by excluding the second type of reference image from the first reference image list indicated by the indicator.

The first reference image list indicated by the indicator may include a first type of reference image and a second type of reference image. The obtaining of the second reference image list may include obtaining the second reference image list by excluding the second type of reference image from the first reference image list indicated by the indicator and adding, to the first reference image list indicated by the indicator, the second type of reference image indicated by a picture order count (POC)-related value obtained from the group header.

The obtaining of the second reference image list may include obtaining the second reference image list including a first type of reference images included in any one reference image list indicated by the indicator and a second type of reference images included in another reference image list indicated by the indicator.

Higher indices may be assigned to one of the first type of reference images and the second type of reference images than the other.

The image decoding method may further include obtaining, from the group header, order information of the first type of reference images and the second type of reference images, wherein indices according to the order information may be assigned to the first type of reference images and the second type of reference images.

The image decoding method may further include obtaining, from the group header, a difference value between a picture order count (POC)-related value of one or more of first reference images included in the first reference image list indicated by the indicator and a POC-related value of one or more of second reference images to be included in the second reference image list, wherein the obtaining of the second reference image list may include obtaining the second reference image list by replacing, based on the difference value, the one or more of the first reference images.

The image decoding method may further include: determining a plurality of blocks in the current image; obtaining address information with respect to block groups from the bitstream; and, according to the address information, configuring, in the current image, the block groups each including one or more blocks, wherein the current block may be any one of the plurality of blocks, and the current block group is any one of the block groups.

The address information may include identification information of a lower right block from among the plurality of blocks included in each of the block groups. The configuring of the block groups may include: configuring a first block group including an upper left block located at an upper left side from among the plurality of blocks and the lower right block indicated by the identification information of the lower right block; identifying an upper left block of a second block group, based on identification information of the plurality of blocks included in the first block group; and configuring the second block group including the lower right block indicated by the identification information of the lower right block and the identified upper left block.

The image decoding method may further include: obtaining, from the group header or a picture parameter set of the bitstream, identification information indicating a post-processing parameter set applied to luma mapping with respect to a prediction sample of the lower block obtained as a result of the prediction-decoding; and luma mapping the prediction sample according to the post-processing parameter set indicated by the identification information.

According to another aspect of the disclosure, there is provided an image decoding apparatus including: at least one memory storing one or more instructions; and at least one processor configured to execute the one or more instructions to: obtain, from a sequence parameter set of a bitstream, information indicating a plurality of first reference image lists for an image sequence including a current image; obtain, from a group header of the bitstream, an indicator for a current block group including a current block in the current image; obtain a second reference image list by modifying a first reference image list indicated by the indicator from among the plurality of first reference image lists into the second reference image list; and prediction-decode a lower block of the current block based on a reference image included in the second reference image list.

The at least one processor is further configured to: modify the first reference image list indicated by the indicator into the second reference image list by adding, to the first reference image list indicated by the indicator, a type of reference image indicated by a picture order count (POC)-related value obtained from the group header.

The at least one processor is further configured to: modify the first reference image list indicated by the indicator into the second reference image list by changing an order of one or more of first reference images included in the first reference image list indicated by the indicator.

The at least one processor is further configured to: modify the first reference image list indicated by the indicator into the second reference image list by removing at least one of a plurality of different types of reference images from the first reference image list indicated by the indicator.

According to another aspect of the disclosure, there is provided an image encoding method including: constructing a plurality of first reference image lists for an image sequence including a current image; selecting, from among the plurality of first reference image lists, a first reference image list for a current block group including a current block in the current image; obtaining a second reference image list by modifying the selected first reference image list into the second reference image list; and prediction-encoding a lower block of the current block based on a reference image included in the second reference image list.

Image encoding and decoding methods according to an embodiment, may include encoding and decoding an image at a low bit rate by using a hierarchical structure of the image, and mage encoding and decoding apparatuses and image according to an embodiment may perform the Image encoding and decoding methods.

However, effects achievable by the image encoding and decoding apparatuses and the image encoding and decoding methods according to an embodiment, are not limited to these mentioned above, and other effects that are not mentioned could be clearly understood by one of ordinary skill in the art from the following descriptions.

BRIEF DESCRIPTION OF THE DRAWINGS

The above and other aspects, features, and advantages of certain embodiments of the present disclosure will be more apparent from the following description taken in conjunction with the accompanying drawings.

FIG. 13 illustrates a process of determining a depth of a coding unit when a shape and size of the coding unit change, when the coding unit is recursively split such that a plurality of coding units are determined, according to an embodiment.

FIG. 17 illustrates various shapes of a coding unit, which may be determined based on split shape mode information which may be represented as a binary code, according to an embodiment.

FIG. 18 illustrates another shape of a coding unit, which may be determined based on split shape mode information which may be represented as a binary code, according to an embodiment.

FIG. 25 is an example diagram illustrating a plurality of first reference image lists obtained through a sequence parameter set.

FIG. 26 is a diagram for describing a method of obtaining a second reference image list.

FIG. 28 is a diagram for describing another method of obtaining a second reference image list.

DETAILED DESCRIPTION

Figure 1:
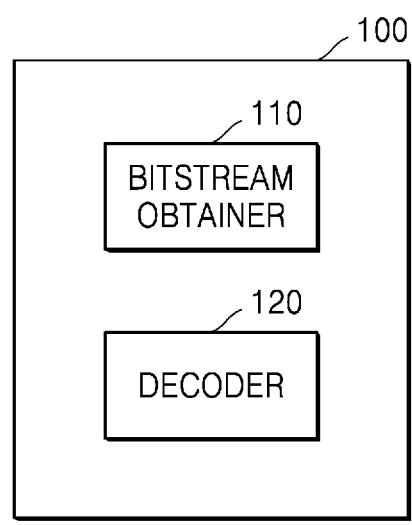
FIG. 1 is a block diagram of an image decoding apparatus according to an embodiment.

Embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

In the description of embodiments, certain detailed explanations of related art are omitted when it is deemed that they may unnecessarily obscure the essence of the present disclosure. Also, numbers (for example, a first, a second, and the like) used in the description of the specification are merely identifier codes for distinguishing one element from another.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an "image" or a "picture" may denote a still image of a video or a moving image, i.e., the video itself.

Also, in the present specification, a "sample" or a "signal" denotes data assigned to a sampling position of an image, i.e., data to be processed. For example, pixel values of an image in a spatial domain and transform coefficients on a transform region may be samples. A unit including at least one such sample may be defined as a block.

Hereinafter, an image encoding method and apparatus and an image decoding method and apparatus based on a coding unit of a tree structure and a transform unit according to an embodiment are described with reference to FIGS. 1 through 19.

FIG. 1 is a block diagram of an image decoding apparatus 100 according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory storing instructions to be performed by the at least one processor.

The bitstream obtainer 110 may receive a bitstream. The bitstream includes information about image encoding of an image encoding apparatus 200 described later. Also, the bitstream may be transmitted from the image encoding apparatus 200. The image encoding apparatus 200 and the image decoding apparatus 100 may be connected by wire or wirelessly, and the bitstream obtainer 110 may receive the bitstream by wire or wirelessly. The bitstream obtainer 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

To describe, in detail, an operation of the image decoding apparatus 100, the bitstream obtainer 110 may receive the bitstream.

The image decoding apparatus 100 may perform an operation of obtaining, from the bitstream, a bin string corresponding to a split shape mode of a coding unit. Also, the image decoding apparatus 100 may perform an operation of determining a split rule of the coding unit. Also, the image decoding apparatus 100 may perform an operation of splitting the coding unit into a plurality of coding units, based on at least one of the bin string corresponding to the split shape mode and the split rule. In order to determine the split rule, the image decoding apparatus 100 may determine a first range of a permissible size of the coding unit according to a ratio between a width and a height of the coding unit. In order to determine the split rule, the image decoding apparatus 100 may determine a second range of the permissible size of the coding unit according to a split shape mode of the coding unit.

Hereinafter, splitting of the coding unit is described in detail according to an embodiment of the present disclosure.

First, one picture may be split into one or more slices or one or more tiles. One slice or one tile may be a sequence of one or more largest coding units (i.e., coding tree units (CTUs)). According to an embodiment, one slice may include one or more tiles, and one slice may include one or more CTUs. The slice including one tile or a plurality of tiles may be determined in the picture.

As a concept compared to the CTU, there is a largest coding block (i.e., a coding tree block (CTB)). The CTB denotes N×N blocks including N×N samples (N is an integer). Each color component may be split into one or more CTBs.

When a picture has three sample arrays (sample arrays for Y, Cr, and Cb components), a CTU includes a CTB of a luma sample, two CTBs of chroma samples corresponding to the luma sample, and syntax structures used to encode the luma sample and the chroma samples. When a picture is a monochrome picture, a CTU includes a CTB of a monochrome sample and syntax structures used to encode the monochrome samples. When a picture is a picture encoded in color planes separated according to color components, a CTU includes syntax structures used to encode the picture and samples of the picture.

One CTB may be split into M×N coding blocks including M×N samples (M and N are integers).

When a picture has sample arrays for Y, Cr, and Cb components, a coding unit includes a coding block of a luma sample, two coding blocks of chroma samples corresponding to the luma sample, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a CTB and a CTU are conceptually distinguished from each other, and a coding block and a coding unit are conceptually distinguished from each other. That is, a coding unit (a CTU) refers to a data structure including a coding block (a CTB) including a corresponding sample and a syntax structure corresponding to the coding block (the CTB). However, because it is understood by one of ordinary skill in the art that a coding unit (a CTU) or a coding block (a CTB) refers to a block of a certain size including a certain number of samples, a CTB and a CTU, or a coding block and a coding unit are mentioned in the following specification without being distinguished unless otherwise described.

An image may be split into CTUs. A size of each CTU may be determined based on information obtained from a bitstream. A shape of each CTU may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma CTU and a luma CTB that may be split into two. Accordingly, when the information about the maximum size of the luma coding block that may be split into two and the information about the luma block size difference obtained from the bitstream are combined with each other, a size of the luma CTU may be determined. A size of a chroma CTU may be determined by using the size of the luma CTU. For example, when a Y:Cb:Cr ratio is 4:2:0 according to a color format, a size of a chroma block may be half a size of a luma block, and a size of a chroma CTU may be half a size of a luma CTU.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a CTU may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or same as the CTU. For example, because a CTU is a coding unit having a maximum size, the CTU is one of coding units. When split shape mode information about a CTU indicates that splitting is not performed, a coding unit determined in the CTU has the same size as that of the CTU. When split shape code information about a CTU indicates that splitting is performed, the CTU may be split into coding units. Also, when split shape mode information about a coding unit indicates that splitting is performed, the coding unit may be split into smaller coding units. However, the splitting of the image is not limited thereto, and the CTU and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transform may be performed by using a coding unit as a transform block.

The splitting of the coding unit will be described in detail with reference to FIGS. 3 through 16. A current block and a neighboring block of the present disclosure may indicate one of the CTU, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, and lower right of the current block.

Figure 3:
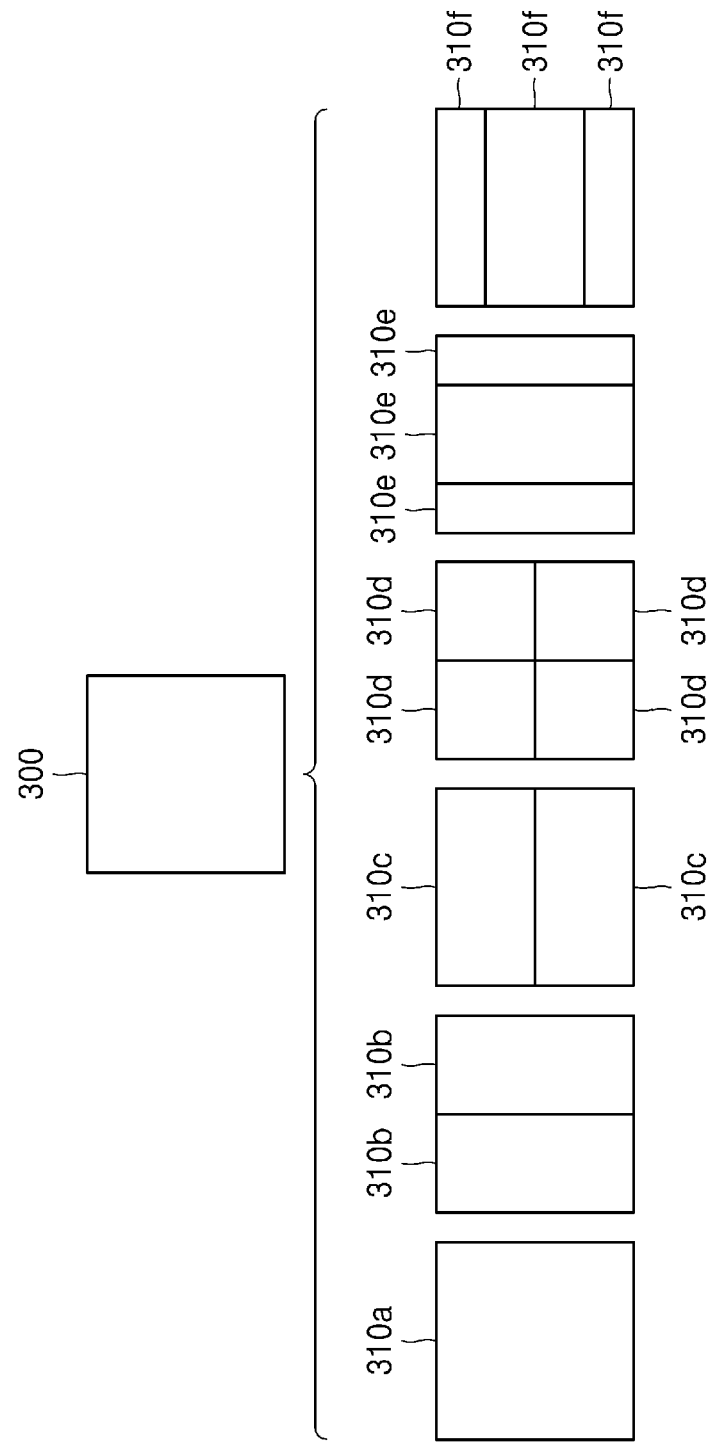
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or a size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit to be a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit to be a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may determine pre-agreed split shape mode information, based on the block shape information. The image decoding apparatus 100 may determine the pre-agreed split shape mode information with respect to a CTU or a smallest coding unit. For example, the image decoding apparatus 100 may determine split shape mode information with respect to the CTU to be a quad split. Also, the image decoding apparatus 100 may determine split shape mode information regarding the smallest coding unit to be "not to perform splitting." In particular, the image decoding apparatus 100 may determine the size of the CTU to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the CTU of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a certain splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various embodiments.

Figure 4:
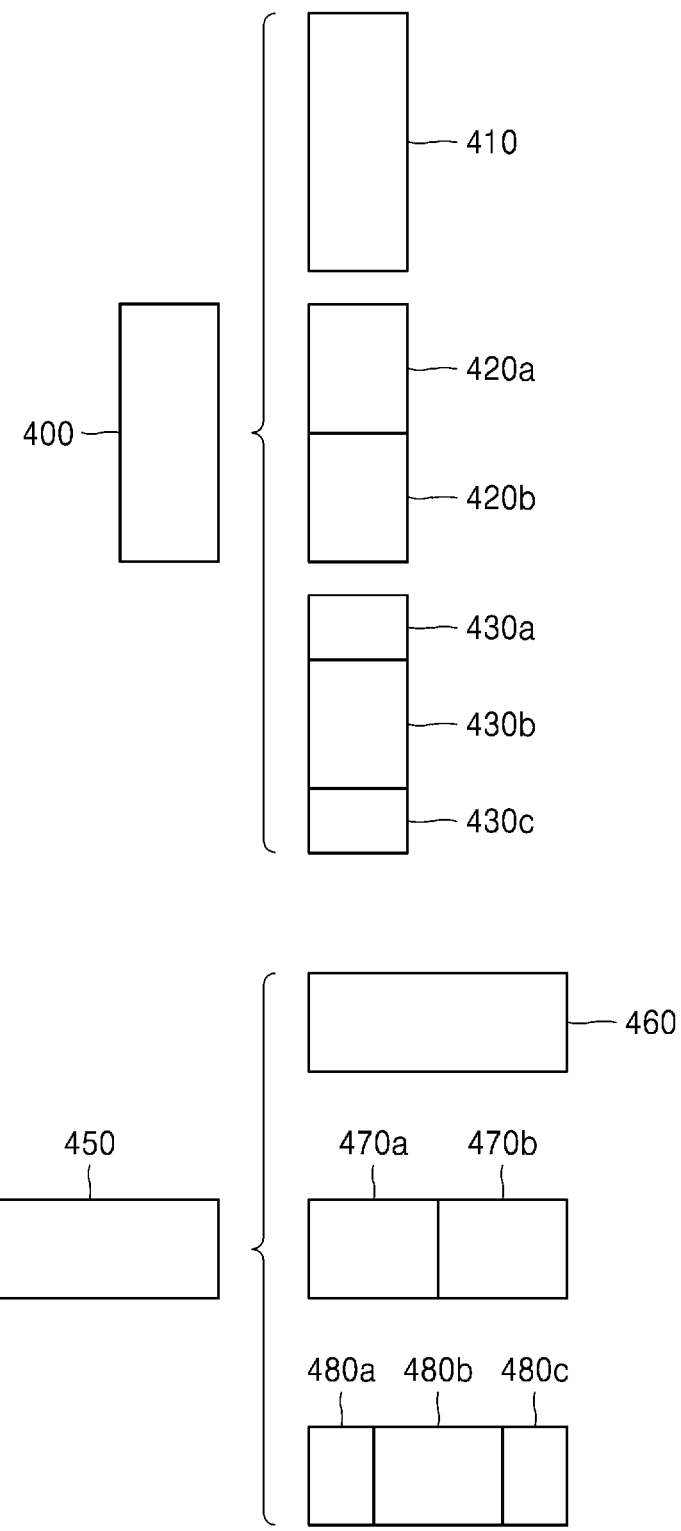
FIG. 4 illustrates a process, performed by an image decoding apparatus, of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a certain splitting method. Certain splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, based on the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a certain coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c or 480a, 480b, and 480c generated as the current coding unit 400 or 450 is split to be different from that of the other coding units 430a and 430c, or 480a or 480c. For example, the image decoding apparatus 100 may restrict the coding unit 430b or 480b at the center location to be no longer split or to be split only a certain number of times, unlike the other coding units 430a and 430c, or 480a and 480c.

Figure 5:
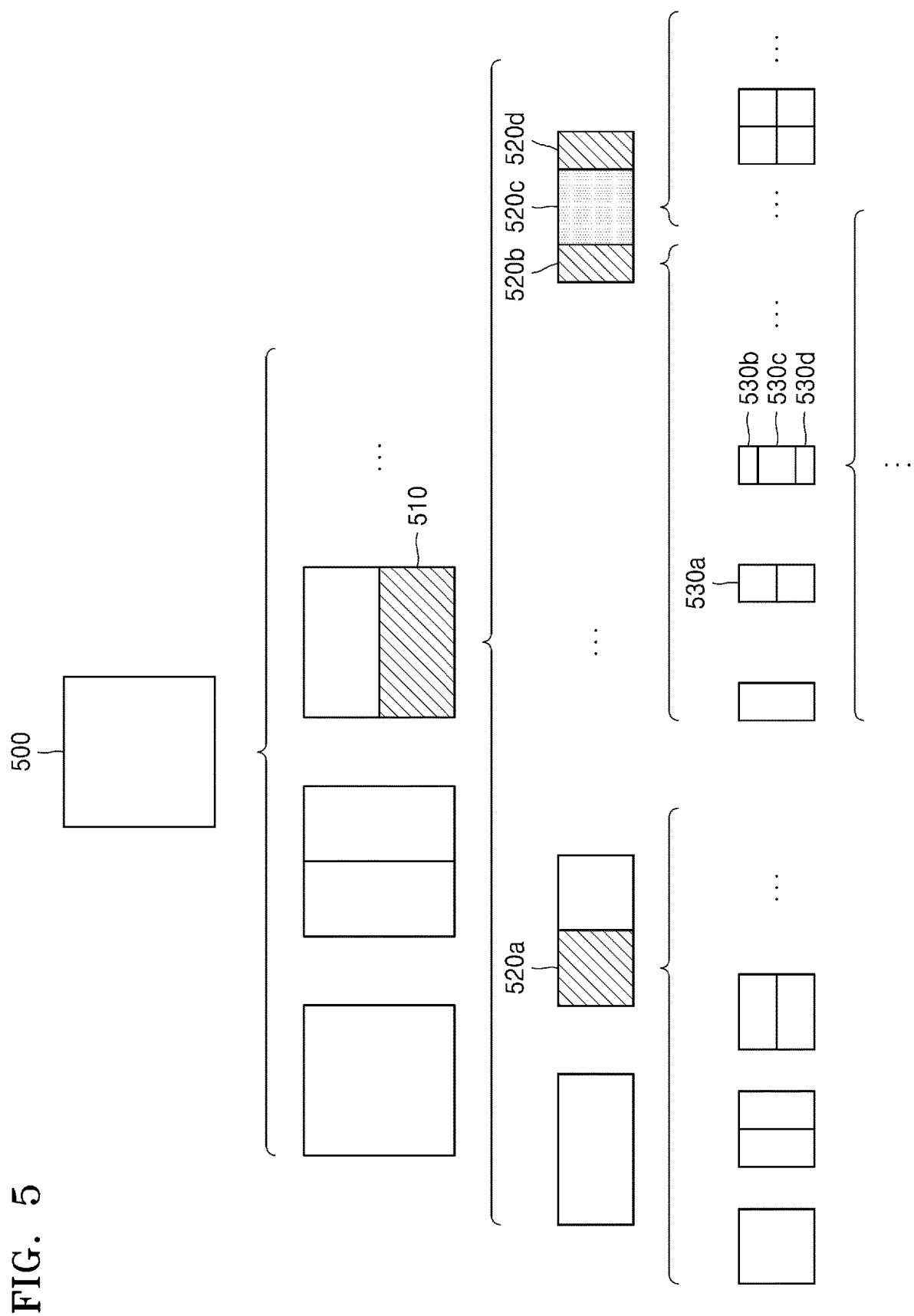
FIG. 5 illustrates a process, performed by an image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, or 520b, 520c, and 520d based on the split shape mode information. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520b, 520c, and 520d determined by splitting the non-square second coding unit 510 (e.g., a coding unit at a center location or a square coding unit) may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a certain restriction on a certain third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a certain location in the current coding unit.

Figure 6:
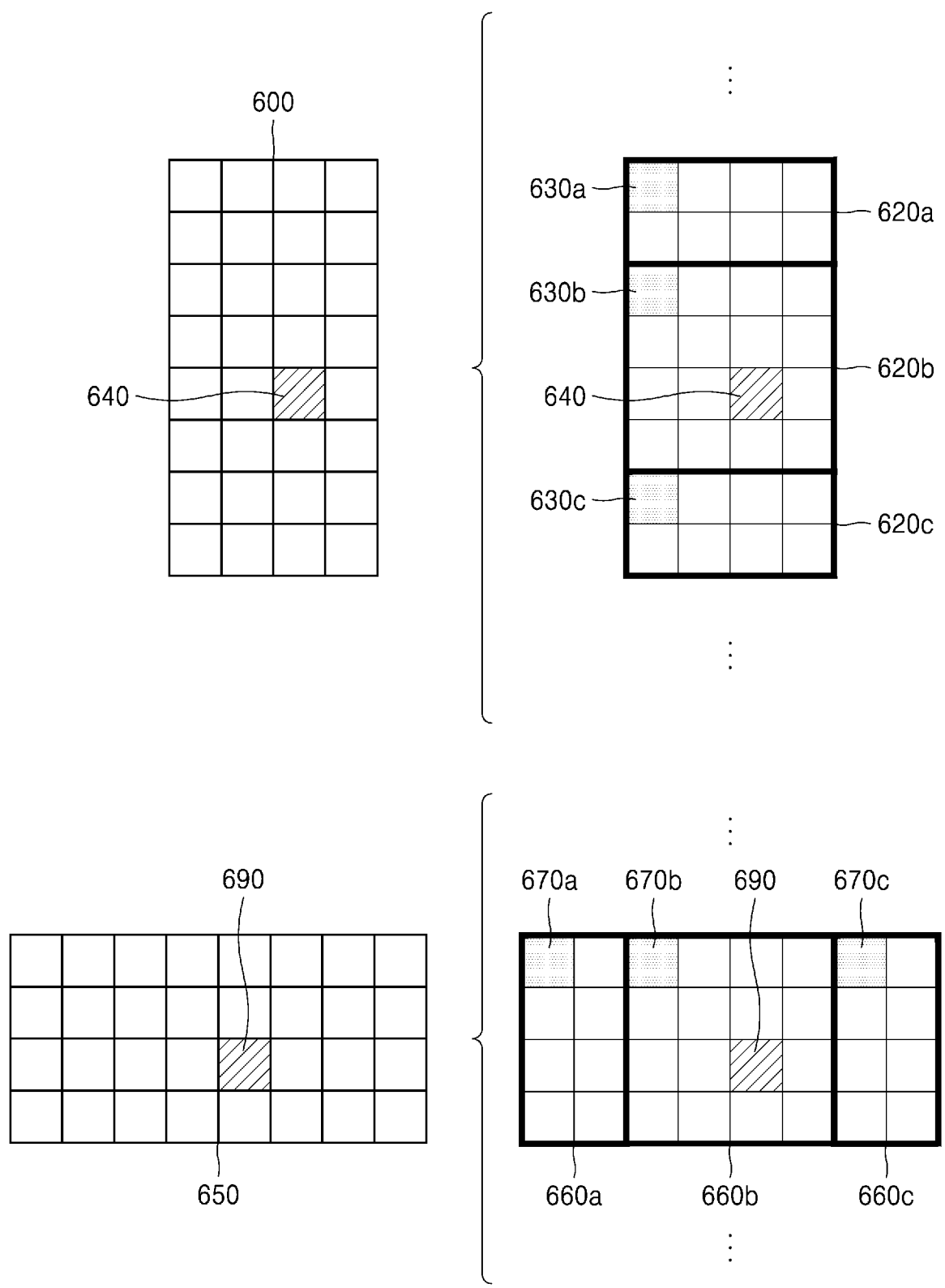
FIG. 6 illustrates a method, performed by an image decoding apparatus, of determining a predetermined coding unit from among an odd number of coding units, according to an embodiment.

FIG. 6 illustrates a method, performed by the image decoding apparatus 100, of determining a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a certain location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of certain samples included in the coding units 620a, 620b, and 620c. In detail, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment, the information indicating the locations of the upper left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a certain criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus, various methods of determining a coding unit at a certain location by comparing the sizes of coding units, which are determined based on coordinates of certain samples, may be used.

The image decoding apparatus 100 may determine the width or height of each of the coding units 660a, 660b, and 660c by using the coordinates (xd, yd) that is information indicating the location of an upper left sample 670a of the left coding unit 660a, the coordinates (xe, ye) that is information indicating the location of an upper left sample 670b of the middle coding unit 660b, and the coordinates (xf, yf) that is information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 600. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus, various methods of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a certain location from among an odd number of coding units determined by splitting the current coding unit, considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units, locations of which are different in the horizontal direction, and put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units, locations of which are different in the vertical direction, and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above in relation to FIG. 6, and thus, detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, based on a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width and height of the current coding unit in half, as the sample from which the certain information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus, detailed descriptions thereof will not be provided here.

According to an embodiment, the image decoding apparatus 100 may determine one or more coding units by splitting the current coding unit, and may determine an order of decoding the one or more coding units, based on a certain block (e.g., the current coding unit).

Figure 7:
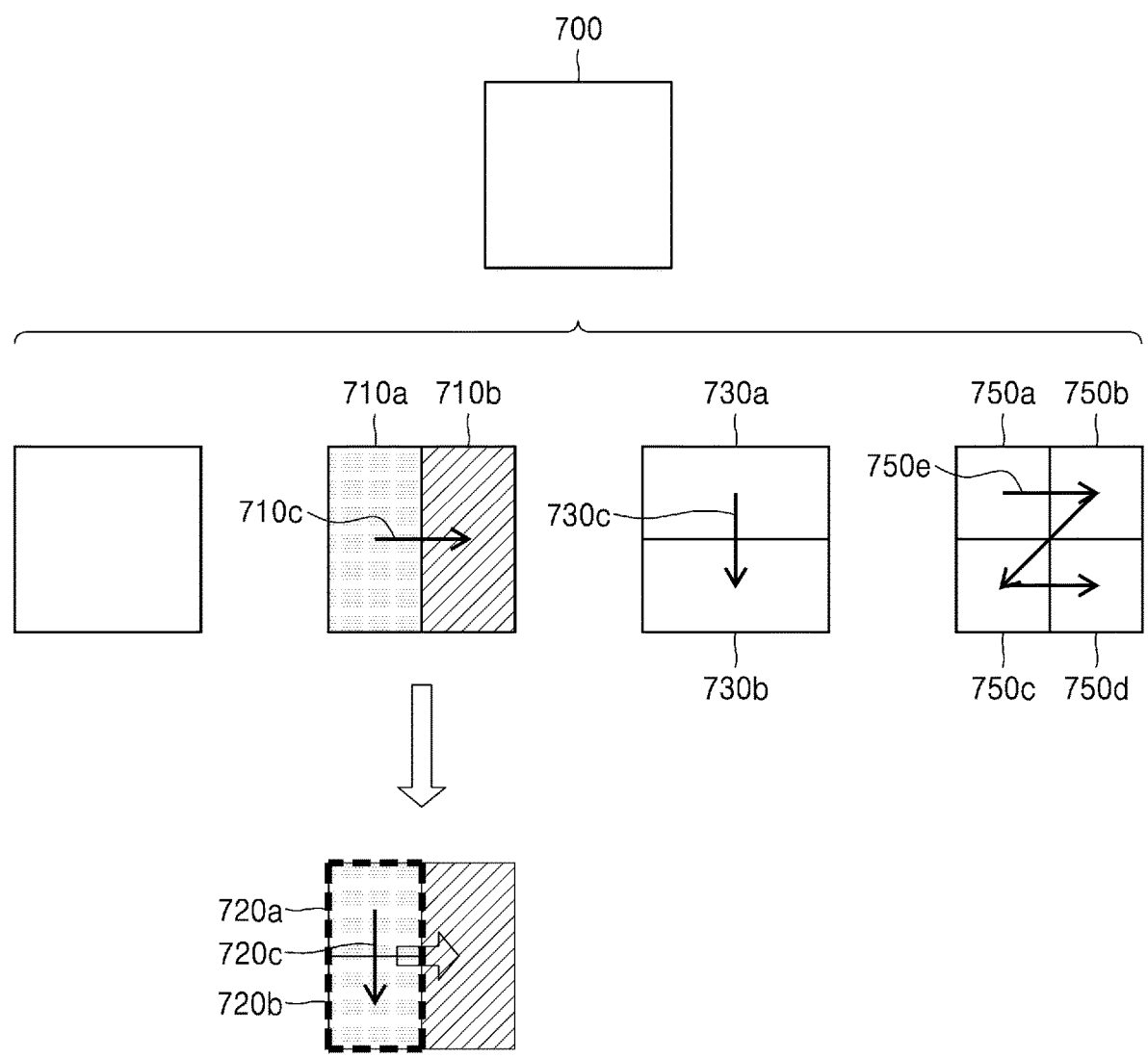
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a certain order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710a and 710b, 730a and 730b, or 750a to 750d. A splitting method of the plurality of coding units 710a and 710b, 730a and 730b, or 750a to 750d may correspond to a splitting method of the first coding unit 700. As such, each of the plurality of coding units 710a and 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to have various shapes, in a certain order.

Figure 8:
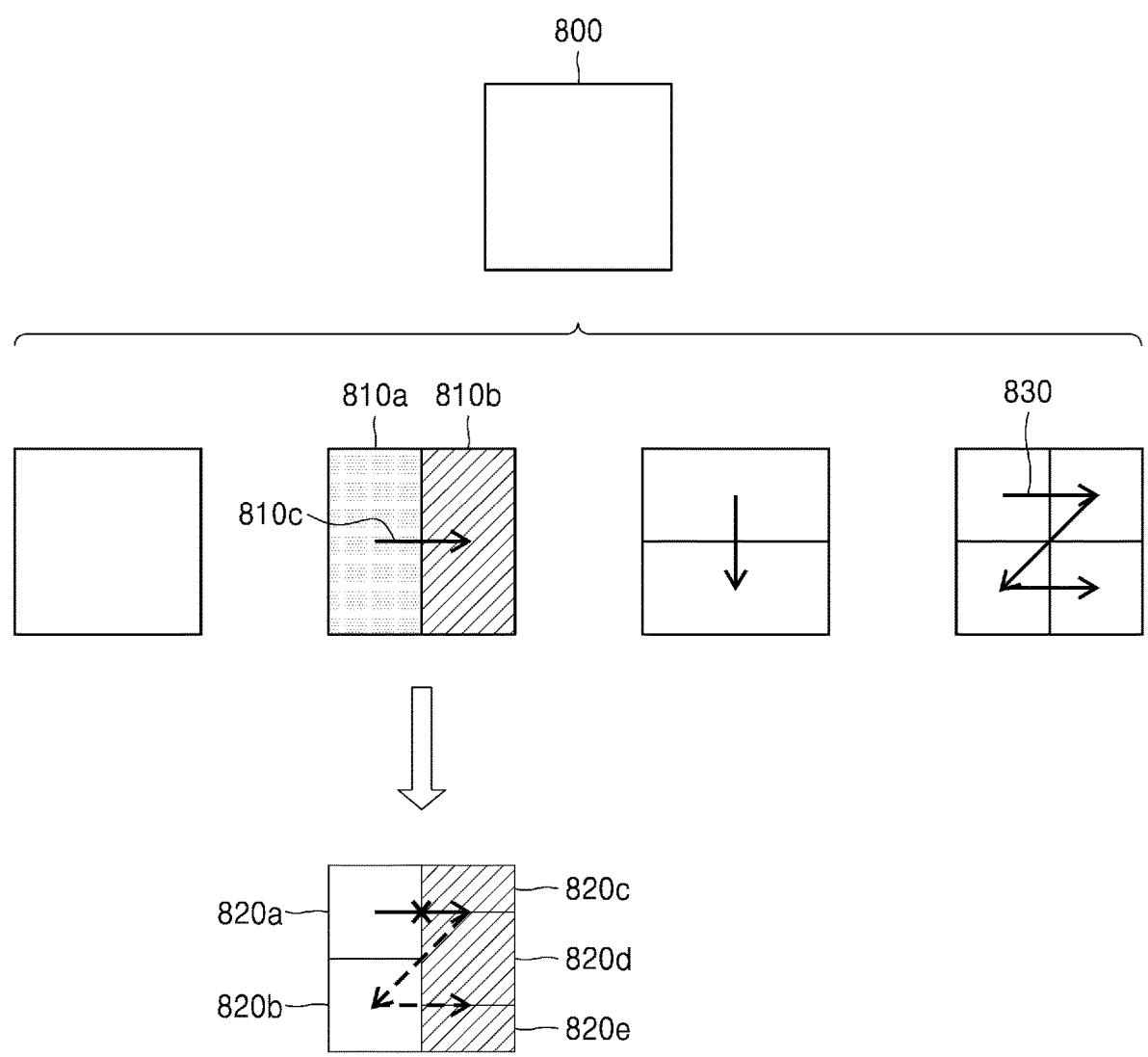
FIG. 8 illustrates a process in which, when coding units are not processable in a predetermined order, an image decoding apparatus determines that a current coding unit is split into an odd number of coding units, according to an embodiment.

FIG. 8 illustrates a process in which, when coding units are not processable in a predetermined order, an image decoding apparatus determines that a current coding unit is split into an odd number of coding units, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. The second coding units 810a and 810b may be processed in a horizontal direction order 810c. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of the block shape information and the split shape mode information. For example, the right second coding unit 810b among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c to 820e included in the first coding unit 800 satisfy the condition for processing in the certain order, and the condition relates to whether at least one of a width and height of the second coding units 810a and 810b is split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus, detailed descriptions thereof will not be provided herein.

Figure 9:
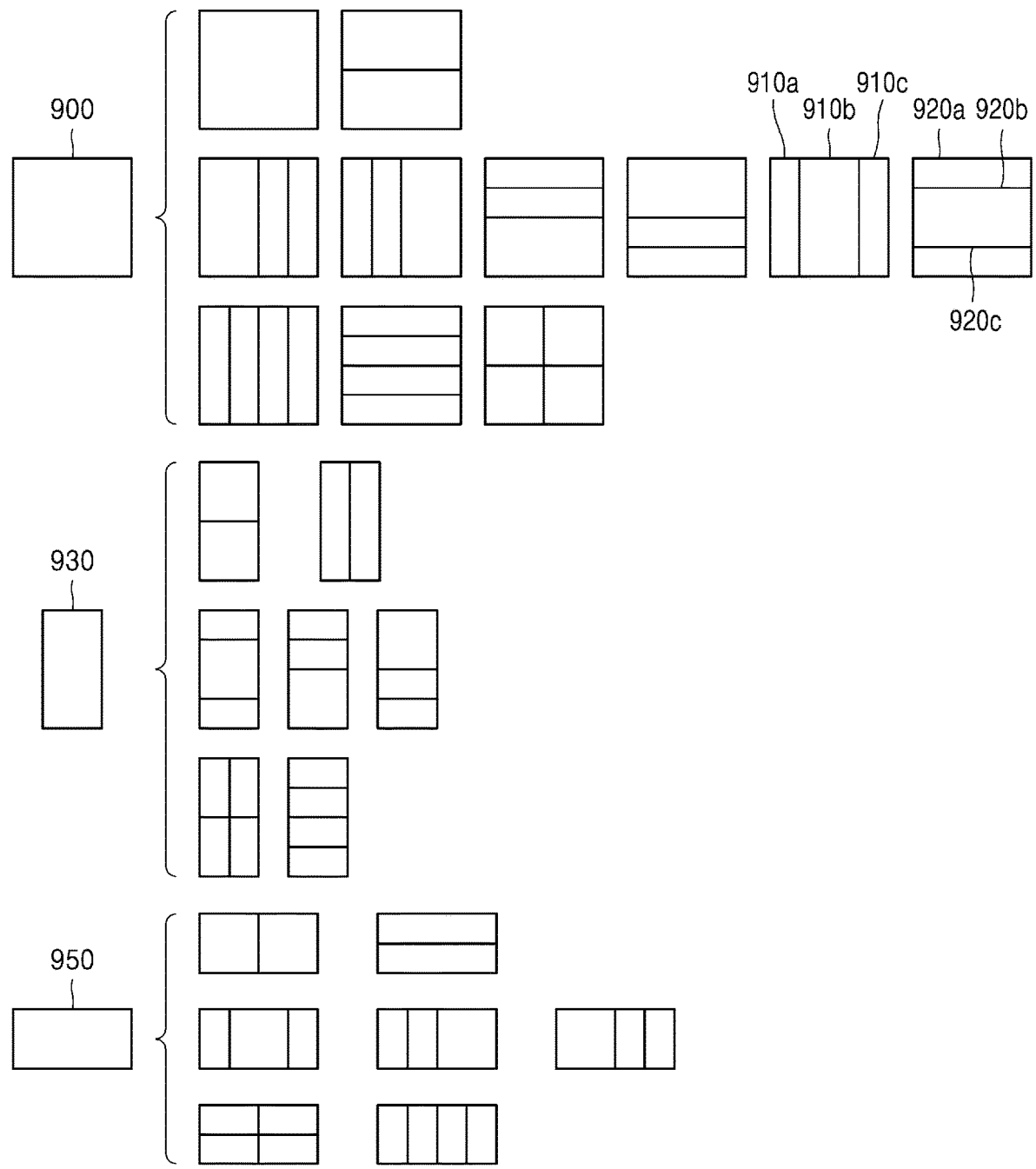
FIG. 9 illustrates a process, performed by an image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained through the bitstream obtainer 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width and height of the first coding unit 900 is split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the certain order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus, detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
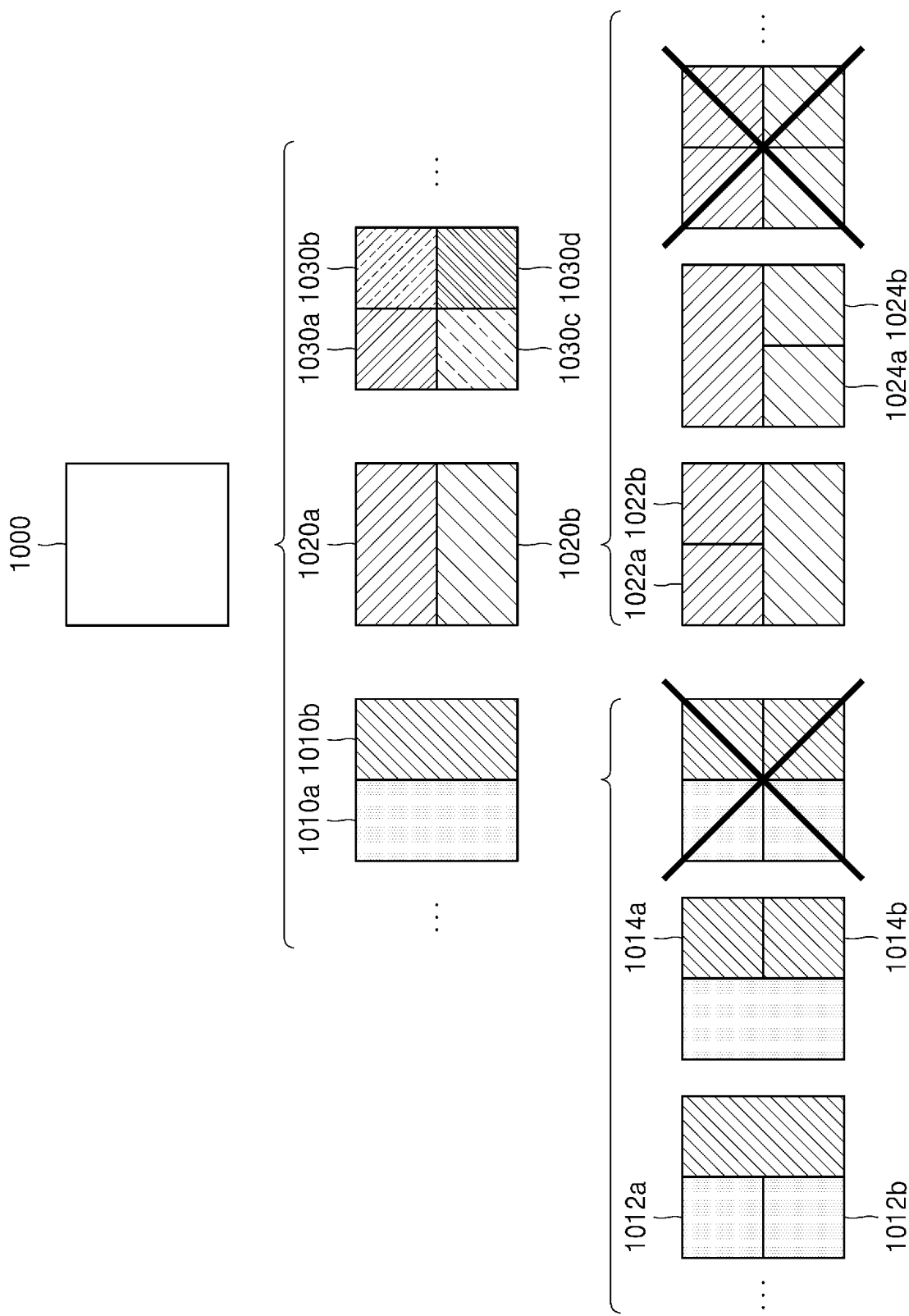
FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

FIG. 10 illustrates that a shape into which a second coding unit is splittable is restricted when the second coding unit having a non-square shape, which is determined when the image decoding apparatus 100 splits a first coding unit 1000, satisfies a certain condition, according to an embodiment.

According to an embodiment, the image decoding apparatus 100 may determine to split the square first coding unit 1000 into non-square second coding units 1010a and 1010b or 1020a and 1020b, based on split shape mode information, which is obtained by the bitstream obtainer 110. The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
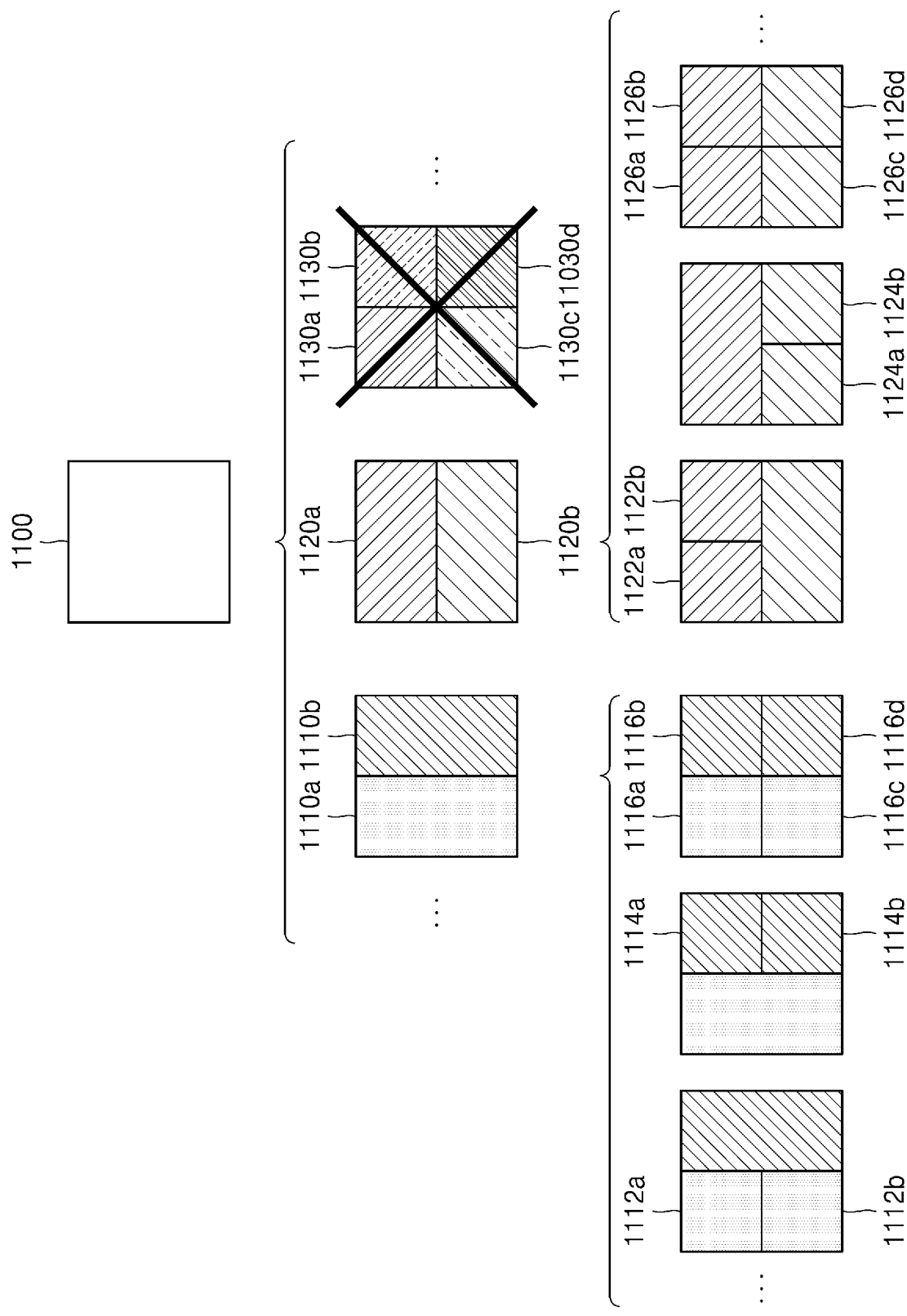
FIG. 11 illustrates a process, performed by an image decoding apparatus, of splitting a square coding unit when split shape mode information is unable to indicate that the square coding unit is split into four square coding units, according to an embodiment.

FIG. 11 illustrates a process, performed by the image decoding apparatus 100, of splitting a square coding unit when split shape mode information is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
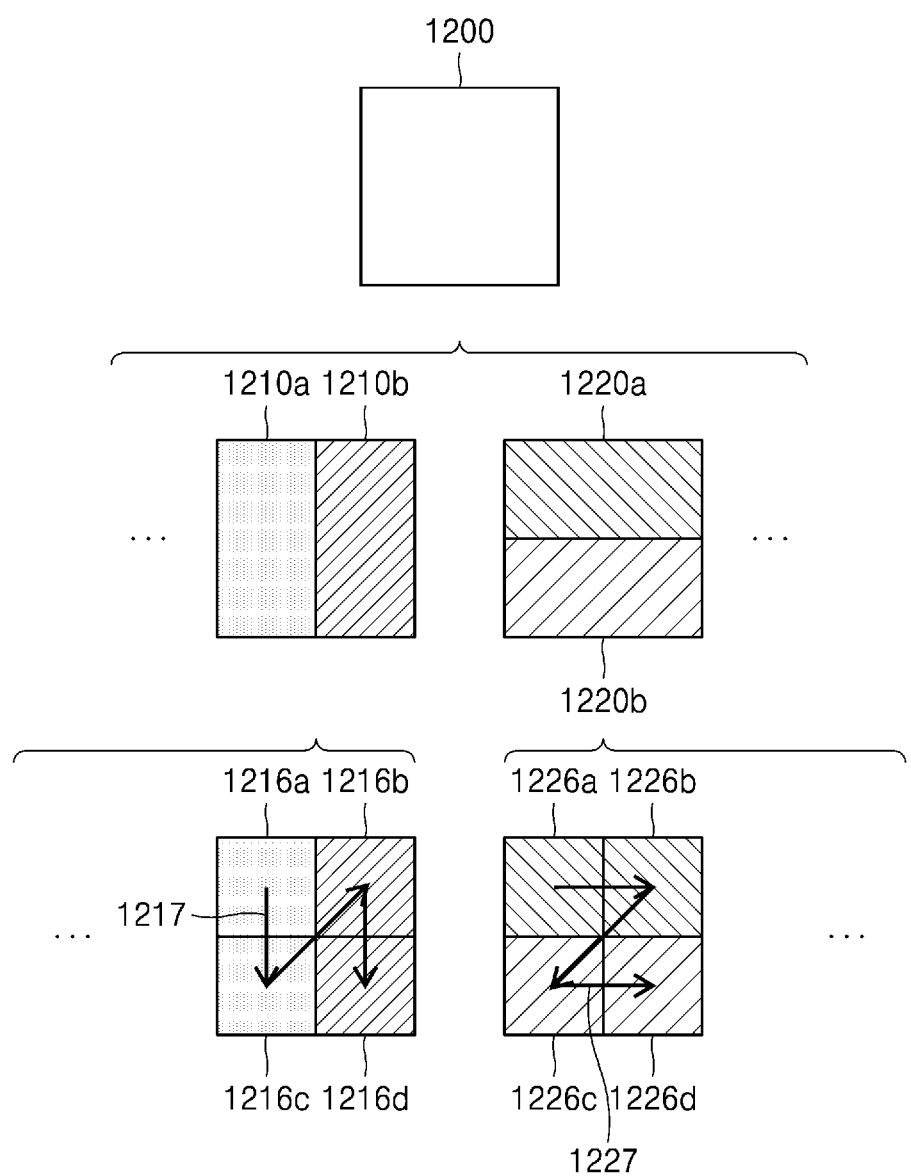
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b or 1220a and 1220b has been described above in relation to FIG. 11, and thus, detailed descriptions thereof will not be provided herein.

According to an embodiment, the image decoding apparatus 100 may process coding units in a certain order. An operation of processing coding units in a certain order has been described above in relation to FIG. 7, and thus, detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape information, the image decoding apparatus 100 may process a plurality of coding units in different orders even when the coding units are eventually determined to be the same shape.

FIG. 13 illustrates a process of determining a depth of a coding unit when a shape and size of the coding unit change, when the coding unit is recursively split such that a plurality of coding units are determined, according to an embodiment.

According to an embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
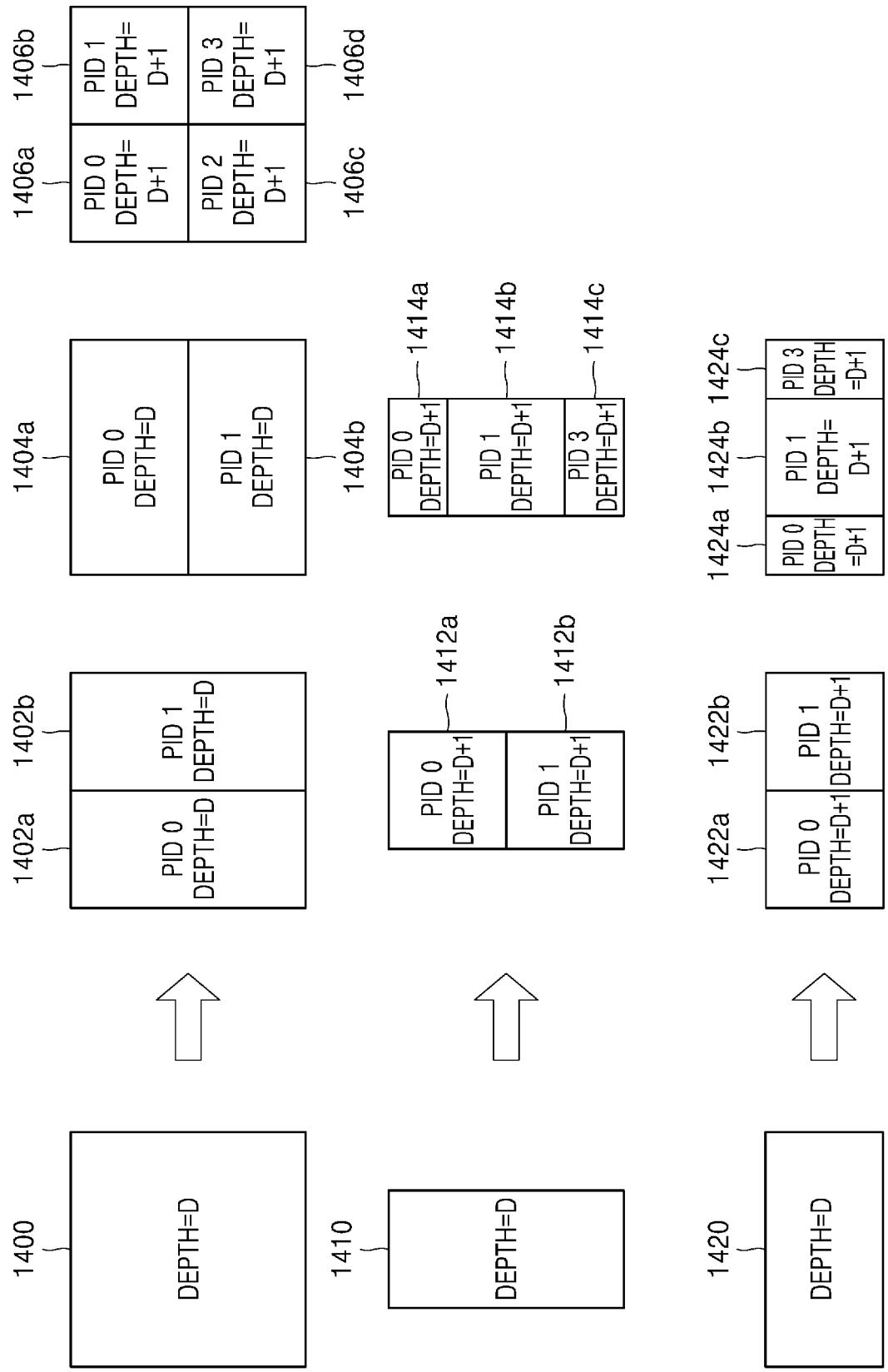
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is lower than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is lower than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is lower than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify respective coding units. According to an embodiment, the PID may be obtained from a sample of a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location are not limited to the above-described examples, and various PIDs and various locations and sizes of coding units may be used.

According to an embodiment, the image decoding apparatus 100 may use a certain data unit where a coding unit starts to be recursively split.

Figure 15:
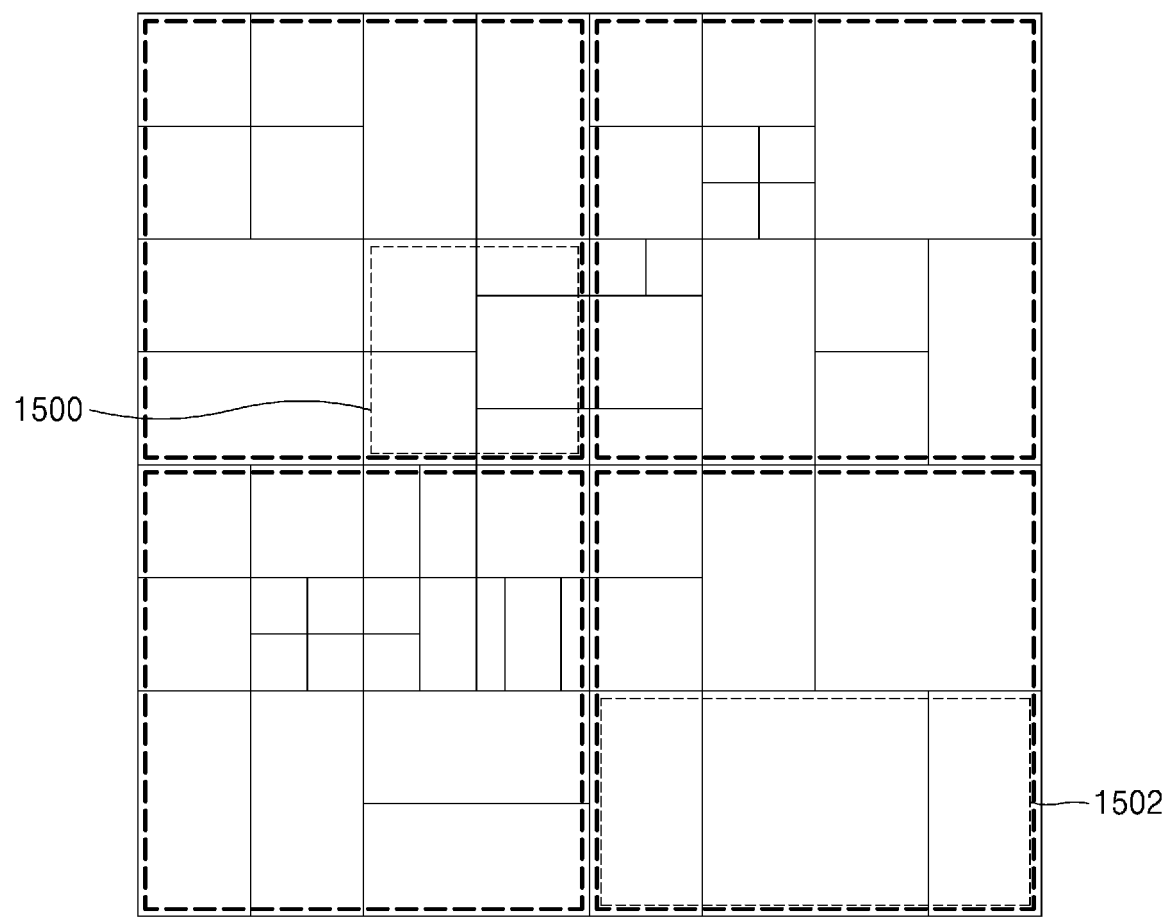
FIG. 15 illustrates that a plurality of coding units are determined based on a plurality of predetermined data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain size shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quad-tree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including at least one reference coding unit (e.g., sequences, pictures, slices, slice segments, tiles, tile groups, CTUs, or the like).

According to an embodiment, for each of various data units described above, the bitstream obtainer 110 of the image decoding apparatus 100 may obtain, from a bitstream, at least one of information about a shape of the reference coding unit and information about a size of the reference coding unit. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a certain condition. That is, the bitstream obtainer 110 may obtain, from the bitstream, only the PID for identifying the size and shape of reference coding units with respect to each slice, slice segment, tile, tile group, or CTU which is a data unit satisfying a certain condition (e.g., a data unit having a size equal to or smaller than a slice) among the various data units (e.g., sequences, pictures, slices, slice segments, tiles, tile groups, CTUs, or the like). The image decoding apparatus 100 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a CTU. That is, a CTU split from a picture may include one or more reference coding units, and coding units may be determined by recursively splitting each reference coding unit. According to an embodiment, at least one of a width and height of the CTU may be integer times at least one of the width and height of the reference coding units. According to an embodiment, the size of reference coding units may be obtained by splitting the CTU n times based on a quadtree structure. That is, the image decoding apparatus 100 may determine the reference coding units by splitting the CTU n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each CTU, each reference coding unit, or each processing block, and may use the obtained syntax element.

Hereinafter, a method of determining a split rule, according to an embodiment of the present disclosure will be described in detail.

The image decoding apparatus 100 may determine a split rule of an image. The split rule may be pre-determined between the image decoding apparatus 100 and the image encoding apparatus 200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, CTUs, or coding units.

The image decoding apparatus 100 may determine the split rule based on a block shape of a coding unit. The block shape may include a size, shape, a ratio of width and height, and a direction of the coding unit. The image encoding apparatus 200 and the image decoding apparatus 100 may pre-determine to determine the split rule based on the block shape of the coding unit. However, an embodiment is not limited thereto. The image decoding apparatus 100 may determine the split rule of the image, based on information obtained from a bitstream received from the image encoding apparatus 200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding process orders. Because the decoding process orders have been described above with reference to FIG. 12, details thereof are not provided again.

Figure 16:
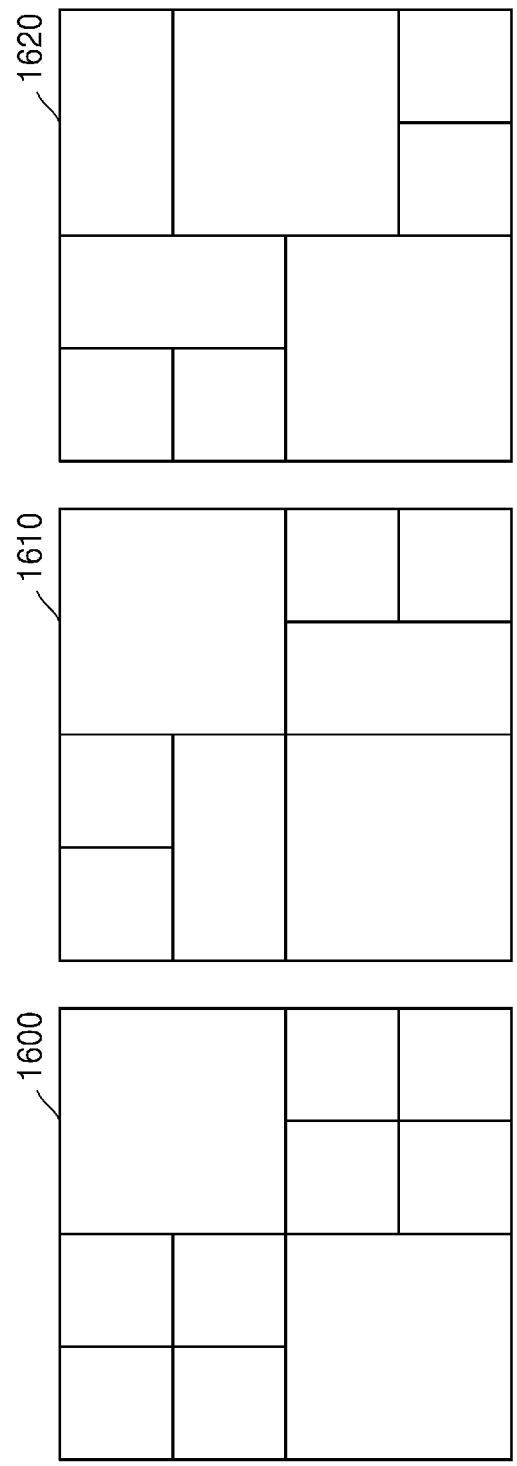
FIG. 16 illustrates coding units which may be determined for each picture, when a combination of shapes into which a coding unit may be split is different for each picture, according to an embodiment.

FIG. 16 illustrates coding units which may be determined for each picture, when a combination of shapes into which a coding unit may be split is different for each picture, according to an embodiment.

Referring to FIG. 16, the image decoding apparatus 100 may, for each picture, differently determine a combination of split shapes into which a coding unit may be split. For example, the image decoding apparatus 100 may decode an image by using a picture 1600 which may be split into four coding units, a picture 1610 which may be split into two or four coding units, and a picture 1620 which may be split into two, three, or four coding units, from among one or more pictures included in the image. In order to split the picture 1600 into a plurality of coding units, the image decoding apparatus 100 may use only split shape information indicating a split into four square coding units. In order to split the picture 1610, the image decoding apparatus 100 may use only split shape information indicating a split into two or four coding units. In order to split the picture 1620, the image decoding apparatus 100 may use only split shape information indicating a split into two, three, or four coding units. The combinations of the split shapes described above are only an embodiment for describing an operation of the image decoding apparatus 100. Thus, the combinations of the split shapes described above should not be interpreted to be limited to the embodiment described above, and should be interpreted such that various types of combinations of the split shapes may be used for a predetermined data unit.

According to an embodiment, the bitstream obtainer 110 of the image decoding apparatus 100 may obtain a bitstream including an index indicating a combination of split shape information for each predetermined data unit (for example, a sequence, a picture, a slice, a slice segment, a tile, or a tile group). For example, the bitstream obtainer 110 may obtain the index indicating the combination of the split shape information from a sequence parameter set, a picture parameter set, a slice header, a tile header, or a tile group header. The bitstream obtainer 110 of the image decoding apparatus 100 may determine, for each predetermined data unit, a combination of split shapes into which a coding unit may be split by using the obtained index, and thus, for each predetermined data unit, a different combination of the split shapes may be used.

FIG. 17 illustrates various shapes of a coding unit, which may be determined based on split shape mode information which may be represented as a binary code, according to an embodiment.

According to an embodiment, the image decoding apparatus 100 may split the coding unit into various shapes by using block shape information and split shape mode information obtained by the bitstream obtainer 110. Shapes into which the coding unit may be split may correspond to various shapes including the shapes described according to the embodiments described above.

Referring to FIG. 17, the image decoding apparatus 100 may split a square coding unit in at least one of a horizontal direction and a vertical direction and may split a non-square coding unit in the horizontal direction or the vertical direction, based on the split shape mode information.

According to an embodiment, when the image decoding apparatus 100 may split a square coding unit in the horizontal direction and the vertical direction into four square coding units, split shapes which may be indicated by the split shape mode information with respect to the square coding unit may correspond to four types. According to an embodiment, the split shape mode information may be represented as a two-digit binary code, and each split shape may be assigned with a binary code. For example, when a coding unit is not split, the split shape mode information may be represented as (00)b, when a coding unit is split in a horizontal direction and a vertical direction, the split shape mode information may be represented as (01)b, when a coding unit is split in the horizontal direction, the split shape mode information may be represented as (10)b, and when a coding unit is split in the vertical direction, the split shape mode information may be represented as (11)b.

According to an embodiment, when the image decoding apparatus 100 splits a non-square coding unit in a horizontal direction or a vertical direction, split shape types which may be indicated by the split shape mode information may be determined depending on the number of coding units into which the non-square coding unit is split. Referring to FIG. 17, the image decoding apparatus 100 may split up to three coding units from a non-square coding unit, according to an embodiment. The image decoding apparatus 100 may split a coding unit into two coding units, and in this case, the split shape mode information may be represented as (10)b. The image decoding apparatus 100 may split a coding unit into three coding units, and in this case, the split shape mode information may be represented as (11)b. The image decoding apparatus 100 may determine not to split a coding unit, and in this case, the split shape mode information may be represented as (0)b. That is, to use the binary code indicating the split shape mode information, the image decoding apparatus 100 may use variable length coding (VLC) rather than fixed length coding (FLC).

Referring to FIG. 17, according to an embodiment, a binary code of the split shape mode information indicating not to split the coding unit may be represented as (0)b. When the binary code of the split shape mode information indicating not to split the coding unit is configured as (00)b, all of 2-bit binary codes of the split shape mode information may have to be used, even though there is no split shape mode information configured as (01)b. However, when, as illustrated in FIG. 17, three split shape types with respect to the non-square coding unit are used, the image decoding apparatus 100 may determine not to split the coding unit, even by using a 1-bit binary code (0) b as the split shape mode information. Thus, a bitstream may be efficiently used. However, the split shapes of the non-square coding unit indicated by the split shape mode information should not be interpreted as being limited to the three split shape types illustrated in FIG. 17 and should be interpreted to include various shapes including the embodiments described above.

Figure 18:
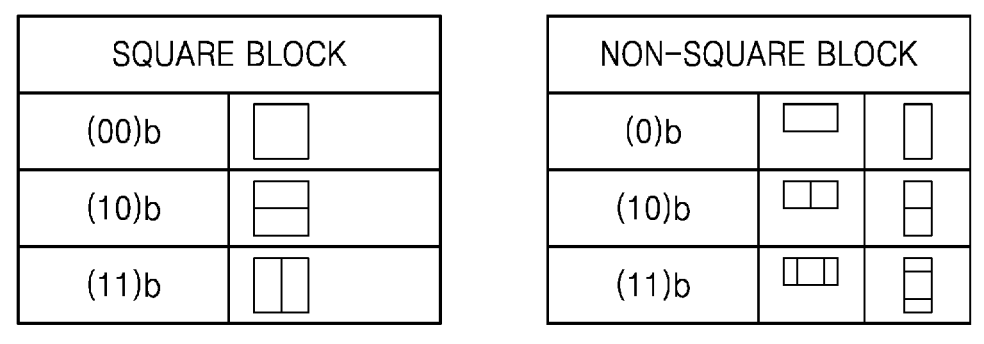

FIG. 18 illustrates another shape of a coding unit, which may be determined based on split shape mode information which may be represented as a binary code, according to an embodiment.

Referring to FIG. 18, the image decoding apparatus 100 may split a square coding unit in a horizontal direction or a vertical direction and may split a non-square coding unit in the horizontal direction or the vertical direction, based on the split shape mode information. That is, the split shape mode information may indicate to split the square coding unit in one direction. In this case, a binary code of the split shape mode information indicating not to split the square coding unit may be represented as (0)b. When the binary code of the split shape mode information indicating not to split the coding unit is configured as (00)b, all of 2-bit binary codes of the split shape mode information may have to be used, even though there is no split shape mode information configured as (01)b. However, when, as illustrated in FIG. 18, three split shape types with respect to the square coding unit are used, the image decoding apparatus 100 may determine not to split the coding unit, even by using a 1-bit binary code (0) b as the split shape mode information. Thus, a bitstream may be efficiently used. However, the split shapes of the square coding unit indicated by the split shape mode information should not be interpreted as being limited to the three split shape types illustrated in FIG. 18 and should be interpreted to include various shapes including the embodiments described above.

According to an embodiment, the block shape information or the split shape mode information may be represented by using a binary code, and the block shape information or the split shape mode information may be directly generated as a bitstream. Also, the block shape information or the split shape mode information which may be represented as a binary code may not be directly generated as a bitstream and may be used as a binary code which is input in context adaptive binary arithmetic coding (CABAC).

According to an embodiment, a process in which the image decoding apparatus 100 obtains syntax with respect to the block shape information or the split shape mode information through the CABAC, is described. A bitstream including a binary code with respect to the syntax may be obtained by the bitstream obtainer 110. The image decoding apparatus 100 may detect a syntax element indicating the block shape information or the split shape mode information by inverse binarizing a bin string included in the obtained bitstream. According to an embodiment, the image decoding apparatus 100 may obtain a set of binary bin strings corresponding to a syntax element to be decoded and may decode each bin by using probability information. Also, the image decoding apparatus 100 may repeat this process until a bin string composed of these decoded bins becomes the same as one of previously obtained bin strings. The image decoding apparatus 100 may determine the syntax element by performing inverse binarization on the bin string.

According to an embodiment, the image decoding apparatus 100 may determine the syntax with respect to the bin string by performing a decoding process of adaptive binary arithmetic coding, and the image decoding apparatus 100 may update a probability model with respect to the bins obtained by the bitstream obtainer 110. Referring to FIG. 17, the bitstream obtainer 110 of the image decoding apparatus 100 may obtain a bitstream indicating a binary code representing split shape mode information, according to an embodiment. The image decoding apparatus 100 may determine the syntax with respect to the split shape mode information by using the obtained 1-bit or 2-bit-sized binary code. In order to determine the syntax with respect to the split shape mode information, the image decoding apparatus 100 may update a probability with respect to each bit of the 2-bit binary code. That is, according to whether a value of a first bin of the 2-bit binary code is 0 or 1, the image decoding apparatus 100 may update a probability for a next bin of having the value of 0 or 1 when the next bin is decoded.

According to an embodiment, in the process of determining the syntax, the image decoding apparatus 100 may update the probability with respect to the bins, in a process of decoding the bins of the bin string with respect to the syntax, and with respect to a predetermined bit from among the bin string, the image decoding apparatus 100 may not update the probability and may determine that the probability is the same.

Referring to FIG. 17, in a process of determining the syntax by using the bin string representing the split shape mode information with respect to the non-square coding unit, the image decoding apparatus 100 may determine the syntax with respect to the split shape mode information by using one bin having a value of 0, when the non-square coding unit is not split. That is, when the block shape information indicates that a current coding unit has a non-square shape, a first bin of the bin string with respect to the split shape mode information may be 0, when the non-square coding unit is not split, and may be 1, when the non-square coding unit is split into two or three coding units. Accordingly, the probability that the first bin of the bin string of the split shape mode information with respect to the non-square coding unit is 0 may be ⅓, and the probability that the first bin of the bin string of the split shape mode information with respect to the non-square coding unit is 1 may be ⅔. As described above, because the split shape mode information indicating that the non-square coding unit is not split may be represented by using only a 1-bit bin string having the value of 0, the image decoding apparatus 100 may determine the syntax with respect to the split shape mode information by determining whether a second bin is 0 or 1, only when the first bin of the split shape mode information is 1. According to an embodiment, when the first bin with respect to the split shape mode information is 1, the image decoding apparatus 100 may regard that the probability that the second bin is 0 and the probability that the second bin is 1 are the same as each other and may decode the bin.

According to an embodiment, in the process of determining the bins of the bin string with respect to the split shape mode information, the image decoding apparatus 100 may use various probabilities with respect to each bin. According to an embodiment, the image decoding apparatus 100 may differently determine the probabilities of the bins with respect to the split shape mode information, according to a direction of a non-square block. According to an embodiment, the image decoding apparatus 100 may differently determine the probabilities of the bins with respect to the split shape mode information, according to a width or a length of a longer side of a current coding unit. According to an embodiment, the image decoding apparatus 100 may differently determine the probabilities of the bins with respect to the split shape mode information, according to at least one of a shape and a length of a longer side of a current coding unit.

According to an embodiment, the image decoding apparatus 100 may determine that the probabilities of the bins with respect to the split shape mode information are the same for coding units having a size that is equal to or greater than a predetermined size. For example, the image decoding apparatus 100 may determine that the probabilities of the bins with respect to the split shape mode information are the same as each other with respect to the coding units having a size that is equal to or greater than 64 samples based on a length of a longer side of the coding unit.

According to an embodiment, the image decoding apparatus 100 may determine initial probabilities of the bins composed in the bin string of the split shape mode information based on a slice type (for example, an I-slice, a P-slice, or a B-slice).

Figure 19:
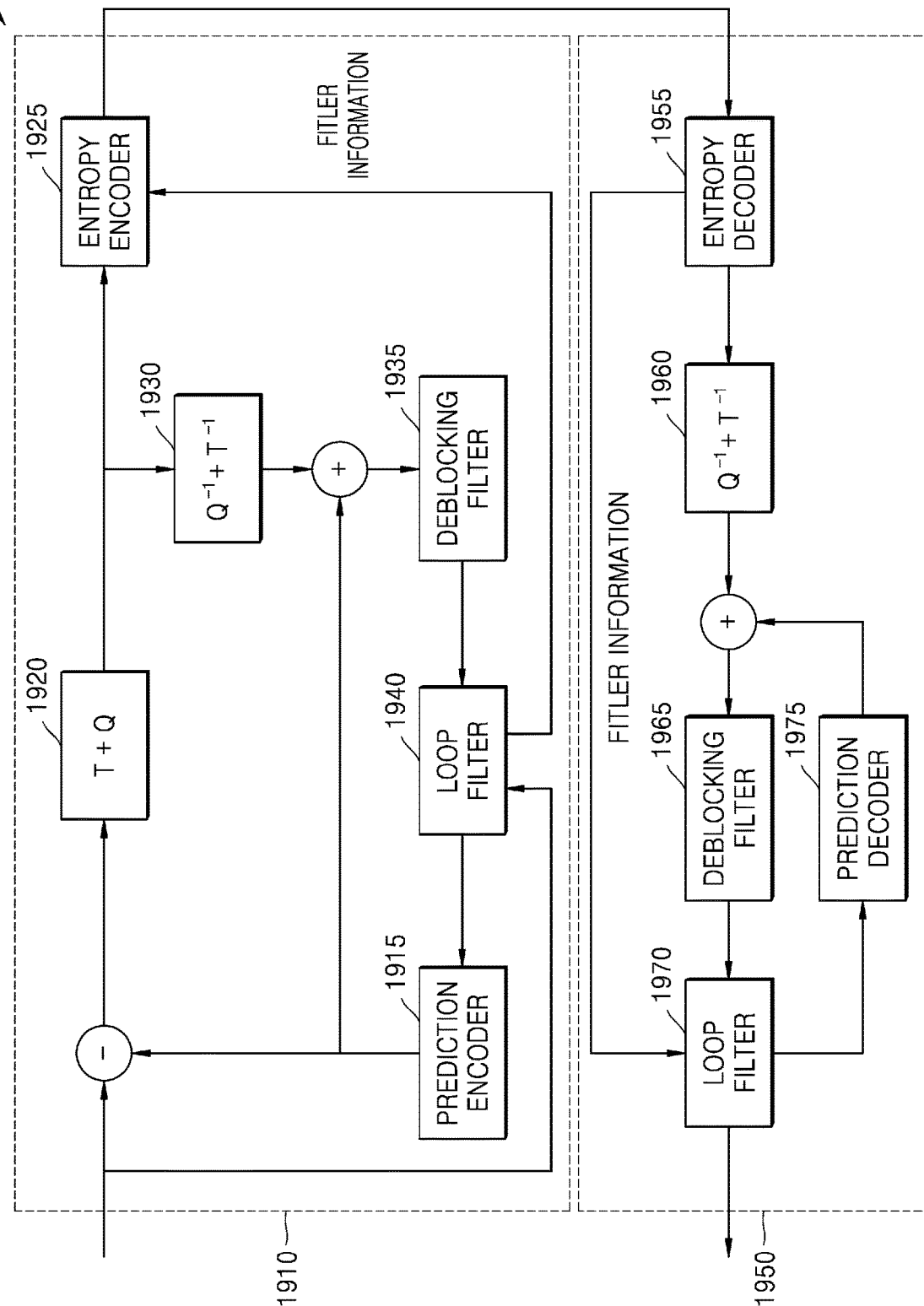
FIG. 19 illustrates a block diagram of an image encoding and decoding system performing loop filtering.

FIG. 19 illustrates a block diagram of an image encoding and decoding system performing loop filtering.

An encoding end 1910 of an image encoding and decoding system 1900 transmits an encoded bitstream of an image and a decoding end 1950 outputs a reconstructed image by receiving and decoding the bitstream. Here, the encoding end 1910 may have a similar configuration as the image encoding apparatus 200 to be described below, and the decoding end 1950 may have a similar configuration as the image decoding apparatus 100.

In the encoding end 1910, a prediction encoder 1915 outputs prediction data via inter-prediction and intra-prediction, and a transformer and quantizer 1920 outputs a quantized transform coefficient of residual data between the prediction data and a current input image. An entropy encoder 1925 encodes and transforms the quantized transform coefficient and outputs the quantized transform coefficient as a bitstream. The quantized transform coefficient is reconstructed as data of a spatial domain via an inverse quantizer and inverse transformer 1930, and the reconstructed data of the spatial domain is output as a reconstructed image via a deblocking filter 1935 and a loop filter 1940. The reconstructed image may be used as a reference image of a next input image via the prediction encoder 1915.

Encoded image data among the bitstream received by the decoding end 1950 is reconstructed as residual data of the spatial domain via an entropy decoder 1955 and an inverse quantizer and inverse transformer 1960. Prediction data and residual data that are output from a prediction decoder 1975 may be combined to construct image data of the spatial domain, and a deblocking filter 1965 and a loop filter 1970 may perform filtering on the image data of the spatial domain to output a reconstructed image with respect to a current original image. The reconstructed image may be used as a reference image for a next original image via the prediction decoder 1975.

The loop filter 1940 of the encoding end 1910 performs loop filtering by using filter information input according to a user input or system setting. The filter information used by the loop filter 1940 is output to the entropy encoder 1925 and transmitted to the decoding end 1950 together with the encoded image data. The loop filter 1970 of the decoding end 1950 may perform loop filtering based on the filter information input from the decoding end 1950.

Various embodiments described above describe an operation related to the image decoding method performed by the image decoding apparatus 100. Hereinafter, an operation of the image encoding apparatus 200 performing an image encoding method, which corresponds to an inverse process of the image decoding method, is described according to various embodiments.

Figure 2:
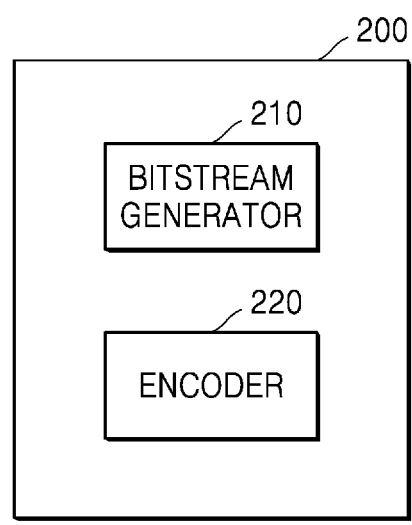
FIG. 2 is a block diagram of an image encoding apparatus according to an embodiment.

FIG. 2 is a block diagram of the image encoding apparatus 200 capable of encoding an image based on at least one of block shape information and split shape mode information, according to an embodiment.

The image encoding apparatus 200 may include an encoder 220 and a bitstream generator 210. The encoder 220 may receive an input image and encode the input image. The encoder 220 may obtain at least one syntax element by encoding the input image. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, and a transform index. The encoder 220 may determine a context model based on the block shape information including at least one of a shape, a direction, a ratio between a width and a height, or a size of a coding unit.

The bitstream generator 210 may generate a bitstream based on the encoded input image. For example, the bitstream generator 210 may generate the bitstream by entropy encoding the syntax element based on the context model. Also, the image encoding apparatus 200 may transmit the bitstream to the image decoding apparatus 100.

According to an embodiment, the encoder 220 of the image encoding apparatus 200 may determine a shape of the coding unit. For example, the coding unit may have a square shape or a non-square shape, and information indicating the square shape or the non-square shape may be included in the block shape information.

According to an embodiment, the encoder 220 may determine into which shape the coding unit is to be split. The encoder 220 may determine a shape of at least one coding unit included in the coding unit, and the bitstream generator 210 may generate the bitstream including the split shape mode information including information about the shape of the coding unit.

According to an embodiment, the encoder 220 may determine whether or not to split the coding unit. When the encoder 220 determines that only one coding unit is included in the coding unit or the coding unit is not split, the bitstream generator 210 may generate the bitstream including the split shape mode information indicating that the coding unit is not split. Also, the encoder 220 may split the coding unit into a plurality of coding units, and the bitstream generator 210 may generate the bitstream including the split shape mode information indicating that the coding unit is split into the plurality of coding units.

According to an embodiment, information indicating into which number of coding units the coding unit is to be split or in which direction the coding unit is to be split may be included in the split shape mode information. For example, the split shape mode information may indicate to split the coding unit in at least one direction of a vertical direction and a horizontal direction or may indicate not to split the coding unit.

The image encoding apparatus 200 may determine information with respect to a split shape mode, based on the split shape mode of the coding unit. The image encoding apparatus 200 may determine a context model based on at least one of a shape, a direction, a ratio between a width and a height, or a size of the coding unit. Also, the image encoding apparatus 200 may generate the information with respect to the split shape mode for splitting the coding unit as a bitstream based on the context model.

In order to determine the context model, the image encoding apparatus 200 may obtain an arrangement for making a correspondence between at least one of the shape, the direction, the ratio between the width and the height, or the size of the coding unit, and an index with respect to the context model. The image encoding apparatus 200 may obtain, from the arrangement, the index with respect to the context model based on at least one of the shape, the direction, the ratio between the width and the height, or the size of the coding unit. The image encoding apparatus 200 may determine the context model based on the index with respect to the context model.

In order to determine the context model, the image encoding apparatus 200 may determine the context model further based on block shape information including at least one of a shape, a direction, a ratio between a width and a height, or a size of a neighboring coding unit adjacent to the coding unit. Also, the neighboring coding unit may include at least one of coding units located at a lower left side, a left side, an upper left side, an upper side, an upper right side, a right side, and a lower right side of the coding unit.

Also, the image encoding apparatus 200 may compare a width of the upper neighboring coding unit with a width of the coding unit, in order to determine the context model. Also, the image encoding apparatus 200 may compare heights of the left and right neighboring coding units with a height of the coding unit. Also, the image encoding apparatus 200 may determine the context model based on results of the comparison.

The operation of the image encoding apparatus 200 includes similar aspects as the operation of the image decoding apparatus 100 described with reference to FIGS. 3 through 19, and thus, is not described in detail.

Hereinafter, embodiments according to the technical concept of the disclosure are sequentially described in detail.

Figure 20:
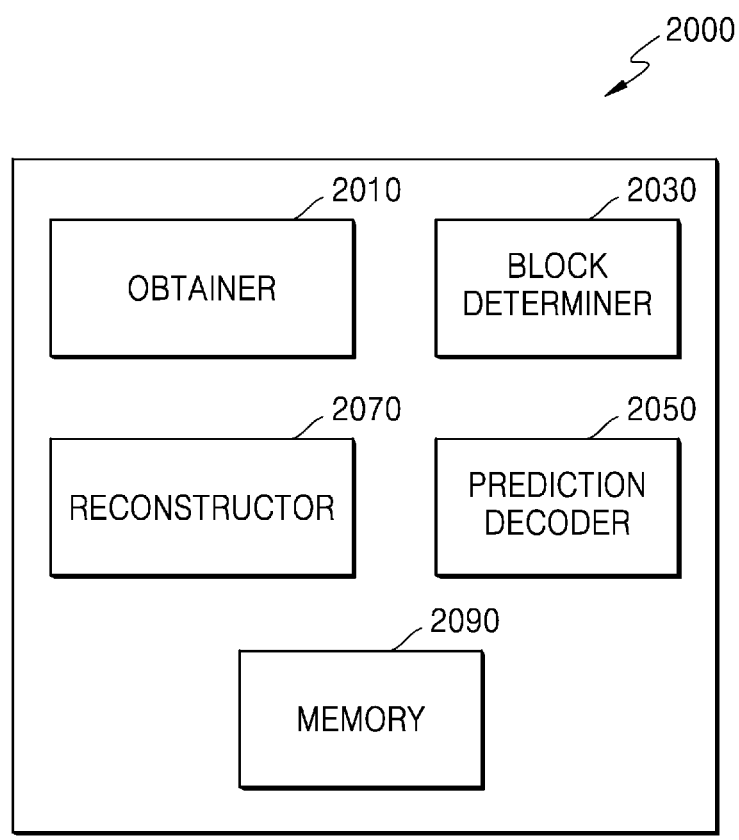
FIG. 20 is a diagram illustrating components of an image decoding apparatus according to an embodiment.

FIG. 20 is a block diagram of components of an image decoding apparatus 2000 according to an embodiment.

Referring to FIG. 20, the image decoding apparatus 2000 may include an obtainer 2010, a block determiner 2030, a prediction decoder 2050, and a reconstructor 2070. The obtainer 2010 illustrated in FIG. 20 may correspond to the bitstream obtainer 110 illustrated in FIG. 1, and the block determiner 2030, the prediction decoder 2050, and the reconstructor 2070 may correspond to the decoder 120 illustrated in FIG. 1.

The obtainer 2010, the block determiner 2030, the prediction decoder 2050, and the reconstructor 2070 according to an embodiment may be realized as at least one processor. The image decoding apparatus 2000 may include at least one memory 2090 storing input and output data of the obtainer 2010, the block determiner 2030, the prediction decoder 2050, and the reconstructor 2070. Also, the image decoding apparatus 2000 may also include a memory controller controlling data inputting and outputting of the memory 290.

The obtainer 2010 may receive a bitstream generated as a result of encoding an image. The obtainer 2010 may obtain, from the bitstream, syntax elements for decoding the image. Binary values corresponding to the syntax elements may be included in the bitstream according to a hierarchical structure of the image. The obtainer 2010 may obtain the syntax elements by entropy coding the binary values included in the bitstream.

Figure 21:
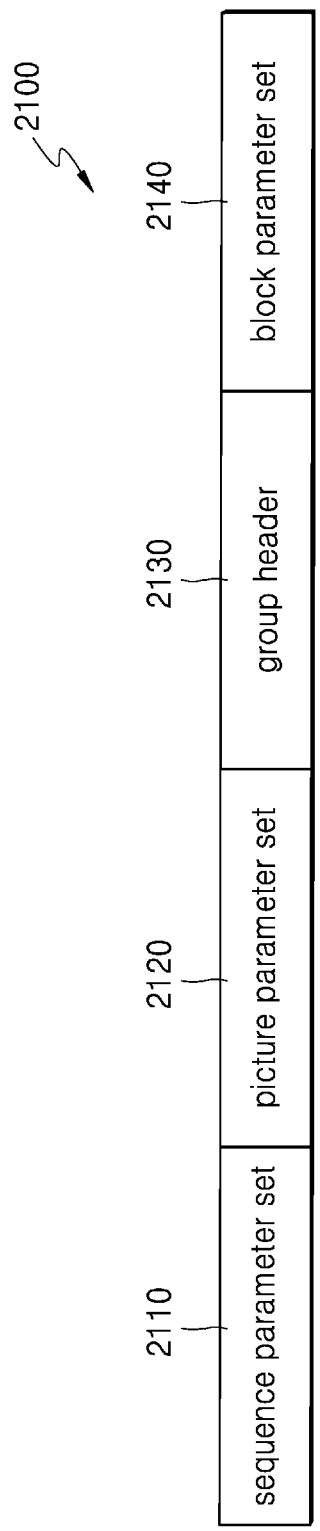
FIG. 21 is an example diagram illustrating a structure of a bitstream generated according to a hierarchical structure of an image.

FIG. 21 is an example diagram of a structure of a bitstream 2100 generated according to a hierarchical structure of an image.

Referring to FIG. 21, the bitstream 2100 may include a sequence parameter set 2110, a picture parameter set 2120, a group header 2130, and a block parameter set 2140.

Each of the sequence parameter set 2110, the picture parameter set 2120, the group header 2130, and the block parameter set 2140 includes information used in each hierarchy according to the hierarchical structure of the image.

In detail, the sequence parameter set 2110 includes information that applies to or is used for an image sequence (e.g., a coded video sequence) including one or more images.

The picture parameter set 2120 includes information that applies to or is used in one image (e.g., one or more individual images within a coded video sequence). The picture parameter set 2120 may refer to the sequence parameter set 2110.

The group header 2130 includes information that applies to or is used in a block group determined in the image and may refer to the picture parameter set 2120 and the sequence parameter set 2110. The group header 2130 may be a slice header.

Also, the block parameter set 2140 includes information used in a block determined in the image and may refer to the group header 2130, the picture parameter set 2120, and the sequence parameter set 2110.

According to an embodiment, the block parameter set 2140 may be identified as at least one of a parameter set of a CTU, a parameter set of a coding unit, a parameter set of a prediction unit, and a parameter set of a transform unit, according to a hierarchical structure of the block determined in the image.

The obtainer 2010 may obtain, from the bitstream 2100, information used for decoding the image, according to the hierarchical structure of the image, and the block determiner 2030, the prediction decoder 2050, and the reconstructor 2070 to be described below may perform required operations by using the information obtained by the obtainer 2010.

The structure of the bitstream 2100 illustrated in FIG. 21 is only an example, and one or more of the parameter sets illustrated in FIG. 21 may be omitted in the bitstream 2100, or a parameter set which is not illustrated, for example, a video parameter set, may be included in the bitstream 2100.

The block determiner 2030 may split a current image into blocks and configure, in the current image, block groups including at least one block. Here, the block may correspond to a tile, and the block group may correspond to a slice. The slice may be referred to as a tile group.

The prediction decoder 2050 may inter-predict or intra-predict lower blocks of the blocks split from the current image to obtain prediction samples corresponding to the lower blocks. Here, the lower block may be at least one of a CTU, a coding unit, and a transform unit.

Hereinafter, descriptions are given by limiting the block as the tile and the block group as the slice. However, it is only an example, and when there is a block B including a set of blocks A, each block A may correspond to a block, and the block B may correspond to a block group. For example, when a set of CTUs corresponds to a tile, the CTU may be the block, and the tile may be the block group.

As described with reference to FIGS. 3 through 16, the block determiner 2030 may split the current image to determine the transform unit, the coding unit, the CTU, the tile, the slice, etc.

Figure 22:
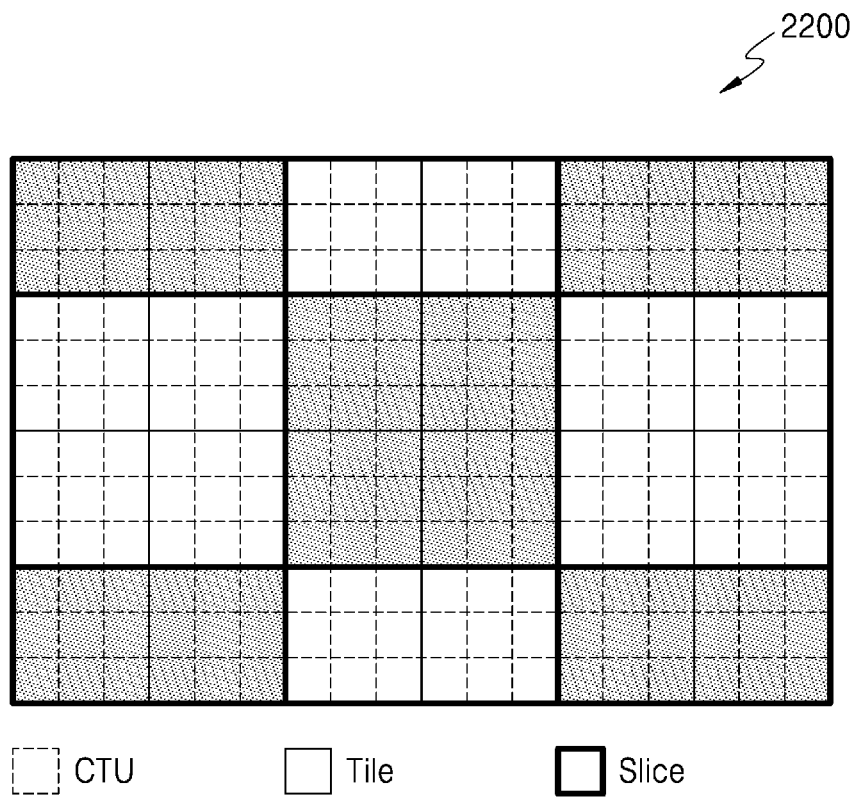
FIG. 22 is a diagram illustrating a slice, a tile, and a coding tree unit (CTU) determined in a current image.

FIG. 22 illustrates a slice, a tile, and a CTU determined in a current image 2200.

The current image 2200 is split into a plurality of CTUs. Sizes of the CTUs may be determined based on information obtained from a bitstream. The CTUs may have same-sized square shapes.

A tile includes one or more CTUs. The tile may have a square or rectangular shape.

A slice includes one or more tiles. The slice may have a square shape or a non-square shape.

According to an embodiment, the block determiner 2030 may split the current image 2200 into a plurality of CTUs according to information obtained from the bitstream, and may configure, in the current image 2200, a tile including at least one CTU and a slice including at least one tile.

According to an embodiment, the block determiner 2030 may split the current image 2200 into a plurality of tiles according to information obtained from the bitstream, and may split each tile into one or more CTUs. Also, the block determiner 2030 may configure, in the current image 2200, a slice including at least one tile.

According to an embodiment, the block determiner 2030 may split the current image 2200 into one or more slices according to information obtained from the bitstream, and may split each slice into one or more tiles. Also, the block determiner 2030 may split each tile into one or more CTUs.

The block determiner 2030 may use address information of slices obtained from the bitstream, in order to configure the slices in the current image 2200. The block determiner 2030 may configure, in the current image 2200, the slices including one or more tiles, according to the address information of the slices obtained from the bitstream. The address information of the slices may be obtained from a video parameter set, a sequence parameter set, a picture parameter met, or a group header of the bitstream.

A method, performed by the block determiner 2030, of configuring the slices in the current image 2200 is described with reference to FIGS. 23 and 24.

Figure 23:
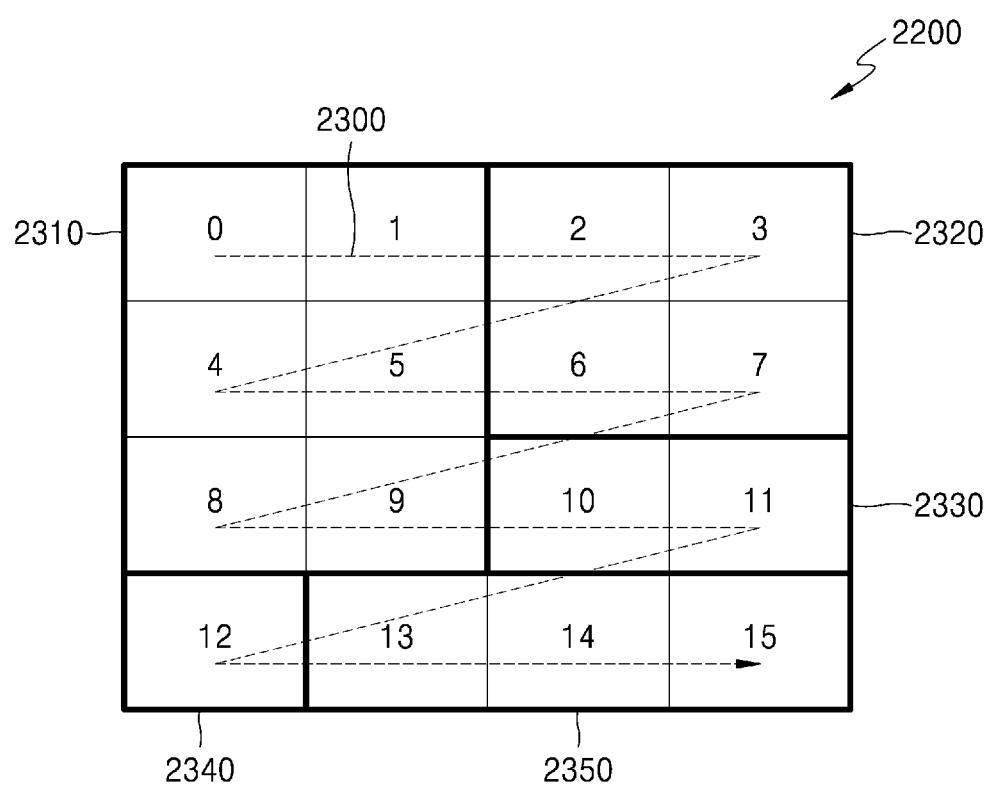
FIG. 23 is a diagram for describing a method of configuring slices in a current image.
Figure 24:
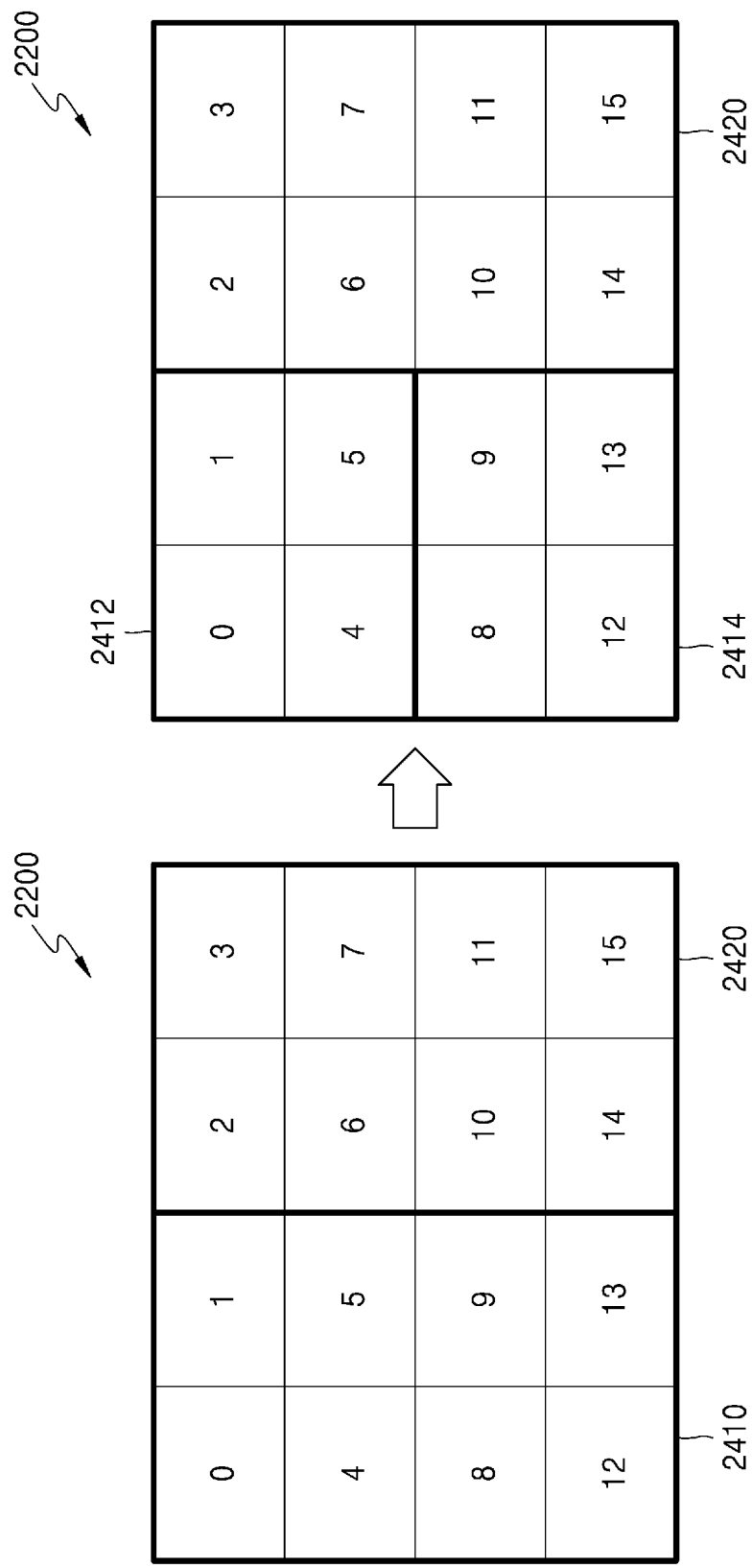
FIG. 24 is a diagram for describing another method of configuring slices in a current image.

FIGS. 23 and 24 are diagrams for describing a method of configuring slices in the current image 2200.

When tiles are configured in the current image 2200, the block determiner 2030 may configure, in the current image 2200, slices including at least one tile, according to address information of the slices obtained from a bitstream.

To describe with reference to FIG. 23, slices 2310, 2320, 2330, 2340, and 2350 may be determined in the current image 2200 according to a raster scan direction 2300, and the slices 2310, 2320, 2330, 2340, and 2350 may be sequentially decoded according to the raster scan direction 2300.

According to an embodiment, the address information may include an identification value of a lower right tile located at a lower right end from among tiles included in each of the slices 2310, 2320, 2330, 2340, and 2350.

In detail, the address information of the slices 2310, 2320, 2330, 2340, and 2350 may include 9, which is an identification value of the lower right tile of the first slice 2310, 7, which is an identification value of the lower right tile of the second slice 2320, 11, which is an identification value of the lower right tile of the third slice 2330, 12, which is an identification value of the lower right tile of the fourth slice 2340, and 15, which is an identification value of the lower right tile of the fifth slice 2350. According to an embodiment, when the fourth slice 2340 is configured in the current image 2200, the fifth slice 2350, which is the last slice, may be automatically identified, and thus, the address information of the fifth slice 2350 may not be included in the bitstream.

In order to configure the first slice 2310, the block determiner 2030 may identify an upper left tile from among the tiles of the current image 2200, that is, a tile having an identification value of 0. Also, the block determiner 2030 may determine a region including Tile 0, and Tile 9 identified from the address information, as the first slice 2310.

Next, in order to configure the second slice 2320, the block determiner 2030 may determine a tile having a least identification value from among tiles not included in a previous slice, that is, the first slice 2310, namely, Tile 2, as an upper left tile of the second slice 2320. Also, the block determiner 2030 may determine a region including Tile 2, and Tile 7 identified from the address information, as the second slice 2320.

Likewise, in order to specify the third slice 2330, the block determiner 2030 may determine a tile having a least identification value from among tiles not included in previous slices, that is, the first slice 2310 and the second lice 2320, namely, Tile 10, as an upper left tile of the third slice 2330. Also, the block determiner 2030 may determine a region including Tile 10, and Tile 11 identified from the address information, as the third slice 2330.

That is, according to an embodiment, the slices may be configured in the current image 2200 by using only the identification information of the lower right tiles included in the bitstream.

According to another embodiment, as the address information for determining the slices, the obtainer 2010 may obtain an identification value of an upper left tile and an identification value of a lower right tile included in each of the slices, and the block determiner 2030 may configure the slices in the current image 2200 according to the information obtained by the obtainer 2010. Because the upper left tile and the lower right tile included in each of the slices may be identified from the address information, the block determiner 2030 may configure regions including the upper left tiles and the lower right tiles identified from the address information as the slices.

According to another embodiment, as the address information for configuring the slices, the obtainer 2010 may obtain an identification value of an upper left tile included in each of the slices, a width of each slice, and a height of each slice, and the block determiner 2030 may configure the slices in the current image 2200 according to the information obtained by the obtainer 2010.

For example, the address information of the second slice 2320 in FIG. 23 may include 2, which is an identification value of the upper left tile, 2, which is a width of the slice, and 2, which is a height of the slice. Here, an indication that the width and the height are 2, denotes that there are two tile rows and two tile columns in a width direction and a height direction of the second slice 2320.

According to an embodiment, the upper left tile of the first slice 2310 is fixed as tile 0, and thus, an identification value of the upper left tile of the first slice 2310 may not be included in a bitstream.

According to another embodiment, the width and the height of the slice obtained from the bitstream may be values obtained by dividing the number of tile rows and the number of tile columns arranged in the width direction and the height direction of the slice by a predetermined scaling factor. In other words, when the address information of the second slice 2320 in FIG. 23 indicates 2, which is the identification value of the upper left tile, 1, which is the width of the slice, and 1, which is the height of the slice, the block determiner 2030 may multiply 1, which is the width of the slice, and 1, which is the height of the slice, by a predetermined scaling factor, for example, 2, so as to identify that there are two tile rows and two tile columns in the width direction and the height direction of the slice.

The block determiner 2030 may determine the first through fifth slices 2310 through 2350 in the current image 2200, according to the address information of the first through fifth slices 2310 through 2350. When up to the fourth slice 2340 is determined in the current image 2200 according to the address information, the fifth slice 2350 may be automatically determined, and thus, the address information of the last slice may not be included in the bitstream.

According to another embodiment, address information of a slice including a tile located at a first row or a tile located at a first column, from among the slices to be determined in the current image 2200, may further include a value indicating the number of slices subsequently existing in a right direction or a lower direction of the corresponding slice, in addition to the identification value of the upper left tile of the corresponding slice, the width of the slice, and the height of the slice. The value indicating the number of slices subsequently existing in the right direction or the lower direction of the slice may be replaced by a value indicating the number of slices arranged in a width direction or a height direction of the slice.

The address information of the first slice 2310 may include information that one slice (that is, the second slice 2320) exists in the right direction and one slice (that is, the fourth slice 2340) exists in the lower direction. Because the first slice 2310 includes both of the tile located at the first row and the tile located at the first column in the image 2200, the address information of the first slice 2310 may include the value indicating the number of slices subsequently existing in the right direction of the slice and the value indicating the number of slices subsequently existing in the lower direction of the slice.

Because the second slice 2320 includes only the tile located at the first row, the address information of the second slice 2320 may include the value indicating the number of slices subsequently existing in the lower direction of the slice.

Because the value(s) indicating the number of slices subsequently existing in the right direction and/or the lower direction is (are) included in the address information, address information of a last slice in a width direction of the current image 2200 (the second slice 2320 and/or the fifth slice 2350 in FIG. 23) may omit the width of the slice, and address information of a last slice in a height direction of the current image 2200 (the fourth slice 2340 and/or the fifth slice 2350 in FIG. 23) may omit the height of the slice. Because the block determiner 2030 may already know that the first slice 2310 has one subsequent slice existing in the width direction of the current image 2200, the block determiner 2030 may derive the width of the subsequent slice of the first slice 2310 by considering a width of the current image 2200, even when the value indicating the width of the subsequent slice is not included in the bitstream. In FIG. 23, because four tiles exist in the width direction of the current image 2200 and two tiles exist in the width direction of the first slice 2310, it may be identified that two tiles exist in the width direction of the second slice 2320 subsequently existing with respect to the first slice 2310. Likewise, because the block determiner 2030 may know that the first slice 2310 has one subsequent slice existing in the height direction of the current image 2200, the block determiner 2030 may derive the height of the subsequent slice of the first slice 2310, even when the value indicating the height of the subsequent slice is not included in the bitstream.

According to another embodiment, the obtainer 2010 may obtain, from the bitstream, split information for splitting the current image 2200 into slices, and the block determiner 2030 may split the current image 2200 into slices according to the split information. Here, the split information may indicate, for example, a quad-split, a bi-split of the height, a bi-split of the width, etc.

The block determiner 2030 may split each of slices obtained when the current image 2200 is initially split, according to the split information, and may hierarchically obtain smaller slices.

As illustrated in FIG. 24, the block determiner 2030 may determine two regions 2410 and 2420 by bi-splitting a width of the current image 2200 according to the split information and may determine two regions 2412 and 2414 by bi-splitting a height of the left region 2410 according to split information of the left region 2410. When split information of the right region 2420 indicates a non-split, and the regions 2412 and 2414 split from the left region 2410 are not further split, the block determiner 2030 may configure the upper left region 2412 as a first slice, the right region 2420 as a second slice, and the lower left region 2414 as a third slice.

According to another embodiment, the block determiner 2030 may configure the slices in the current image 2200 according to pre-configured map information, and may further split at least one slice in the current image 2200 or merge two or more slices, according to correction information obtained from the bitstream, to configure final slices. The map information may include address information of slices located in an image. For example, the block determiner 2030 may initially configure the slices in the image 2200 according to the map information obtained from a video parameter set or a sequence parameter set of the bitstream, and may finally configure the slices in the image 2200 according to correction information obtained from a picture parameter set.

When tiles and slices are determined in the current image, the block determiner 2030 may inter-predict at least one of coding units included in the tiles. Here, a method of configuring a reference image list used for inter-prediction is described.

Referring to FIG. 20, the prediction decoder 2050 prediction-decodes the coding units included in the tiles determined in the current image. The prediction decoder 2050 may prediction-decode the coding units through inter-prediction or intra-prediction. According to inter-prediction, a prediction sample of the coding unit is obtained based on a reference block in a reference image indicated by a motion vector, and a reconstruction sample of the coding unit is obtained based on residual data obtained from the prediction sample and a bitstream. The residual data may not be included in the bitstream according to a prediction mode, and in this case, the prediction sample may be determined as the reconstruction sample.

For inter-prediction, a reference image list including reference images may have to be constructed. According to an embodiment, the obtainer 2010 may obtain information indicating a plurality of first reference image lists from a sequence parameter set of the bitstream. The information indicating the plurality of first reference image lists may include a display order (output order) of decoded images, and/or a process order of decoded images, such as a picture order count (POC)-related value of the reference image. The plurality of first reference image lists are used for an image sequence including a current image.

According to an embodiment, the information indicating the plurality of first reference image lists may include the number of first reference image lists. In this case, the prediction decoder 2050 may construct the first reference image lists corresponding to the number of first reference image lists that is identified from the bitstream. In this case, the prediction decoder 2050 may construct the first reference image lists according to the same method performed by an image encoding apparatus 3300.

When encoding coding units included in a predetermined slice, it may be inappropriate to use the plurality of first reference image lists for an image sequence, depending on the characteristics of an image. Thus, when there is no reference image list which may be used for inter-predicting the coding units in a current slice, from among the plurality of first reference image lists, a new reference image list may be obtained from a group header. However, in this case, because the new reference image list is included in the group header, a bit rate may be increased. Thus, a method for constructing an optimum reference image list to be used for a current slice by using the plurality of first reference image lists signaled through the sequence parameter set, is required.

According to an embodiment, the obtainer 2010 may obtain, from the group header of the bitstream, an indicator indicating at least one of the plurality of first reference image lists used for an image sequence. Also, the prediction decoder 2050 may obtain a second reference image list modified and refined from the first reference image list indicated by the indicator.

The second reference image list may be obtained by substituting at least one of reference images included in the first reference image list indicated by the indicator by another reference image, by changing an order of one or more of the reference images, or by adding a new reference image to the first reference image list.

To construct the second reference image list, the obtainer 2010 may obtain modification and refinement information from the group header of the bitstream. The modification and refinement information may include a POC-related value of a reference image to be removed from the first reference image list indicated by the indicator, a POC-related value of a reference image to be added to the second reference image list, a difference value between the POC-related value of the reference image to be removed from the first reference image list and the POC-related value of the reference image to be added to the second reference image list, information for changing an order of images, etc. According to an embodiment, in addition to the group header of the bitstream, the modification and refinement information may be obtained from a parameter set, for example, a picture parameter set.

When the second reference image list is obtained, the prediction decoder 2050 may prediction-decode coding units included in a slice based on at least one of reference images included in the second reference image list to obtain prediction samples of the coding units.

The prediction decoder 2050 may prediction-decode coding units included in a next slice by using one of the plurality of first reference image lists used for the image sequence other than the first reference image list indicated by the indicator, and using the second reference image list. In other words, the second reference image list obtained for the current slice may also be used for the next slice. In detail, an indicator indicating a reference image list used in the next slice between the one of the plurality of first reference image lists other than the first reference image list indicated by the indicator obtained with respect to the current slice and the second reference image list, may be newly obtained, and according to the reference image list indicated by the indicator or a reference image list modified and refined from the reference image list indicated by the indicator, the coding units included in the next slice may be prediction-decoded. Accordingly, even when a new reference image list is not signaled through the sequence parameter set or the group header, an appropriate reference image list for prediction-decoding the coding units of the slices may be constructed only by updating previous reference image lists.

Hereinafter, a method of obtaining the second reference image list modified and refined from the first reference image list is described with reference to FIGS. 25 through 30.

FIG. 25 is an example diagram illustrating a plurality of first reference image lists 2510, 2520, and 2530 obtained from a sequence parameter set.

FIG. 25 illustrates three first reference image lists 2510, 2520, and 2530. This is only an example, and the number of first reference image lists obtained from the sequence parameter set may be variously modified.

Referring to FIG. 25, the first reference image lists 2510, 2520, and 2530 may include short-term type or long-term type reference images. The short-term type reference images indicate images designated as short-term types from among reconstructed images stored in a decoded picture buffer (DPB), and the long-term type reference images indicate images designated as long-term types from among the reconstructed images stored in the DPB.

The reference images included in the first reference image lists 2510, 2520, and 2530 may be specified by POC-related values. In detail, the short-term type reference image may be specified by a difference value between a POC of a current image and a POC of the short-term type reference image, that is, a delta value, and the long-term type reference image may be specified by a least significant bit (LSB) of a POC of the long-term type reference image. The long-term type reference image may also be specified by a most significant bit (MSB) of the POC of the long-term type reference image.

According to an embodiment, the first reference image lists 2510, 2520, and 2530 may include only the short-term type reference images or only the long-term type reference images. That is, all of the reference images illustrated in FIG. 25 may be the short-term type reference images or the long-term type reference images. Also, according to an embodiment, some of the first reference image lists 2510, 2520, and 2530 may include only the short-term type reference images, and the others may include only the long-term type reference images.

FIG. 26 is a diagram for describing a method of obtaining the second reference image list.

The prediction decoder 2050 may obtain a second reference image list 2600 by changing at least one of reference images included in the first reference image list 2510 indicated by the indicator to another reference image. Referring to FIG. 26, it may be identified that a short-term type reference image having a delta value of −1, a long-term type reference image having an LSB of 10, and a short-term type reference image having a delta value of −3 in the first reference image list 2510 are respectively replaced by a short-term type reference image having a delta value of −2, a long-term type reference image having an LSB of 8, and a short-term type reference image having a delta value of −5 in the second reference image list 2600. FIG. 26 illustrates that all reference images in the first reference image list 2510 are replaced by other reference images. However, it is only an example, and only one or more of the reference images in the first reference image list 2510 may be replaced by other reference images.

According to an embodiment, the prediction decoder 2050 may replace only a particular type of reference image from among the reference images included in the first reference image list 2510, for example, a long-term type reference image, by another long-term type reference image. That is, a short-term type reference image from among the reference images included in the first reference image list 2510 may be intactly maintained in the second reference image list 2600, and only the long-term type reference image may be replaced by another long-term type reference image according to information obtained from a bitstream. Referring to FIG. 26, only a particular type of reference image from among the reference images included in the first reference image list 2510, that is, the long-term type reference image having the LSB of 10, may be replaced by the long-term reference image having the LSB of 8 in the second reference image list 2600. According to an embodiment, the long-term type reference image from among the reference images included in the first reference image list 2510 may be intactly maintained in the second reference image list 2600, and only the short-term type reference image in the first reference image list 2510 may be replaced by another short-term type reference image.

To replace the reference image, the obtainer 2010 may obtain a POC-related value of a new reference image from a group header of the bitstream, and the prediction decoder 2050 may include, in the second reference image list 2600, a reference image indicated by the POC-related value obtained by the obtainer 2010.

To specify a reference image to be replaced by the new reference image (that is, a reference image to be removed), from among the reference images included in the first reference image list 2510, the obtainer 2010 may further obtain, from the bitstream, an index of the reference image to be removed from the first reference image list 2510. When all of the reference images included in the first reference image list 2510 are to be removed, the index of the reference image to be removed from the first reference image list 2510 may not be included in the bitstream.

As described above, when a particular type of reference image is predetermined to be removed from the first reference image list 2510, the index of the reference image to be removed may not be included in the bitstream, and the prediction decoder 2050 may remove the predetermined reference image from among the reference images included in the first reference image list 2510 and may include, in the second reference image list 2600, the reference image indicated by the POC-related value obtained from the bitstream.

According to an embodiment, information indicating the new reference image to be included in the second reference image list 2600 may be a difference value between the POC-related value of the new reference image and a POC-related value of the reference image to be removed from the first reference image list 2510. For example, in FIG. 26, because the reference image having the LSB of 10 in the first reference image list 2510 is replaced by the reference image having the LSB of 8 in the second reference image list 2600, the information indicating the new reference image may include 2 (i.e., 2=10−8). The prediction decoder 2050 may derive the POC-related value of the reference image to be newly included in the second reference image list 2600, based on the difference value between the POC-related values, and the POC-related value of the reference image to be removed from the first reference image list 2510.

According to an embodiment, the new reference image may be added in the second reference image list 2600 according to the order of the reference image to be removed from the first reference image list 2510 indicated by the indicator. As illustrated in FIG. 26, when a long-term type reference image assigned with an index of 1 is removed from the first reference image list 2510, a new reference image may also be assigned with an index of 1.

Figure 27:
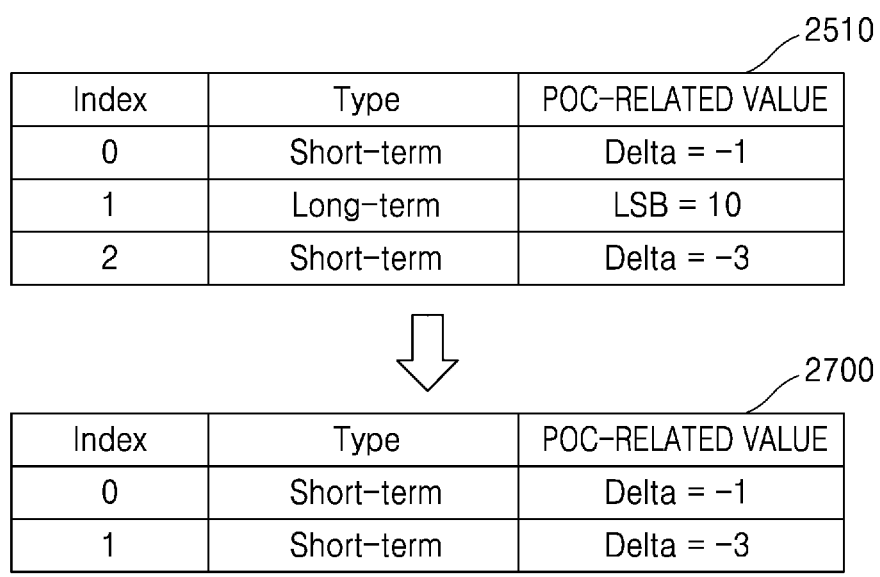
FIG. 27 is a diagram for describing a method of obtaining a second reference image list.

FIG. 27 is a diagram for describing another method of obtaining the second reference image list.

The prediction decoder 2050 may obtain a second reference image list 2700 by excluding particular types of reference images from among the reference images in the first reference image list 2510 indicated by the indicator from among the plurality of first reference image lists for the image sequence. Referring to FIG. 27, it may be identified that the long-term type reference image from among the reference images in the first reference image list 2510 indicated by the indicator is not included in the second reference image list 2700.

According to an embodiment, the prediction decoder 2050 may also obtain the second reference image list 2700 in which the short-term type reference image from among the reference images in the first reference image list 2510 is excluded.

FIG. 28 is a diagram for describing another method of obtaining the second reference image list.

The prediction decoder 2050 may also obtain a second reference image list 2800 by changing an order of the reference images in the first reference image list 2510 indicated by the indicator, according to modification and refinement information obtained from the group header of the bitstream. Here, according to the modification and refinement information, the order of all reference images in the first reference image list 2510 may be changed, or the order of one or more reference images in the first reference image list 2510 may be changed.

For example, the modification and refinement information obtained from the group header of the bitstream may include indices of the reference images in the first reference image list 2510 arranged according to an order in which the reference images are to be changed. In detail, in FIG. 28, when a reference picture having an index of 0, a reference picture having an index of 1, and a reference picture having an index of 2 in the first reference image list 2510 are to be respectively changed to the reference picture having the index of 1, the reference picture having the index of 2, and the reference picture having the index of 0 in the second reference image list 2800, the group header of the bitstream may include (2, 0, 1) as the modification and refinement information. The prediction decoder 2050 may assign the index of 0 to the reference image assigned with the index of 2 in the first reference image list 2510, the index of 1 to the reference image assigned with the index of 0, and the index of 2 to the reference image assigned with the index of 1, to construct the second reference image list 2800.

As another example, the modification and refinement information obtained from the group header of the bitstream may include indices of reference images, an order of which has to be changed, from among the reference images in the first reference image list 2510. In detail, in FIG. 28, when the order of the reference picture having the index of 1 and the reference picture having the index of 2 in the first reference image list 2510 is to be changed, the group header of the bitstream may include (1, 2) as the modification and refinement information. The prediction decoder 2050 may assign the index of 2 to the reference image assigned with the index of 1 in the first reference image list 2510 and the index of 1 to the reference image assigned with the index of 2 to construct the second reference image list 2800.

Figure 29:
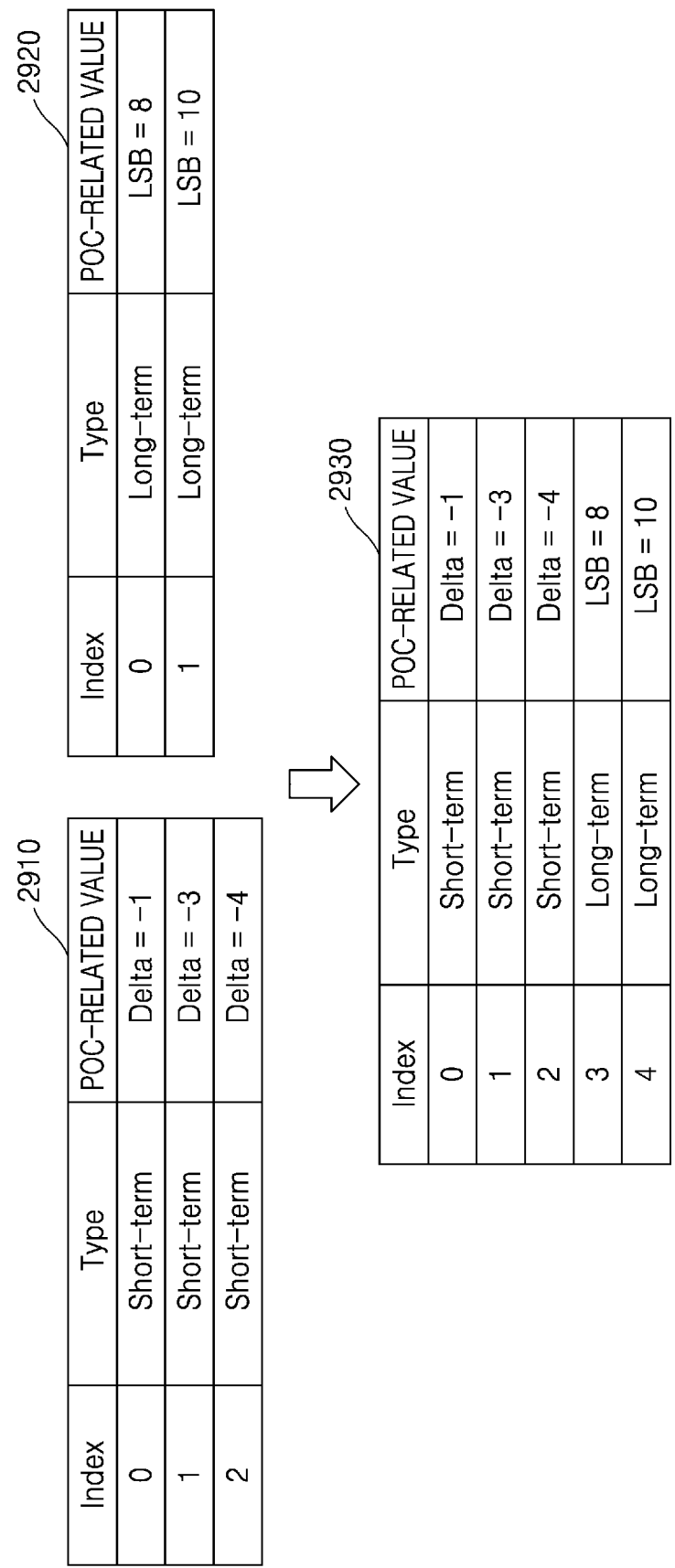
FIG. 29 is a diagram for describing another method of obtaining a second reference image list.

FIG. 29 is a diagram for describing another method of obtaining the second reference image list.

The number of first reference image lists indicated by the indicator from among the plurality of first reference image lists used for the image sequence may be plural. That is, as illustrated in FIG. 29, the indicator may indicate a first reference image list 2910 including only short-term type reference images and a first reference image list 2920 including only long-term type reference images.

The prediction decoder 2050 may obtain a second reference image list 2930 including the short-term type reference images and the long-term type reference images included in the first reference image lists 2910 and 2920 indicated by the indicator. Here, in the second reference image list 2930, higher indices may be assigned to the long-term type reference images than the short-term type reference images. In contrast, in the second reference image list 2930, higher indices may be assigned to the short-term type reference images than the long-term type reference images.

According to an embodiment, the obtainer 2010 may obtain, from the bitstream, order information of the short-term type reference images and the long-term type reference images, and the prediction decoder 2050 may, according to the obtained order information, assign the indices to the short-term type reference images and the long-term type reference images included in the second reference image list 2930.

According to another embodiment, the first reference image list 2910 and the first reference image list 2920 may include at least one reference image, regardless of a type of the reference image. In this case, when a short-term type reference image exists in the first reference image list 2910, and a long-term type reference image exists in the first reference image list 2920, indicated by the indicator, the prediction decoder 2950 may obtain the second reference image list 2930 including the short-term type reference image included in the first reference image list 2910 and the long-term type reference image included in the first reference image list 2920. Alternatively, when a long-term type reference image exists in the first reference image list 2910, and a short-term type reference image exists in the first reference image list 2920, indicated by the indicator, the prediction decoder 2950 may obtain the second reference image list 2930 including the long-term type reference image included in the first reference image list 2910 and the short-term type reference image included in the first reference image list 2920.

Figure 30:
FIG. 30 is a diagram for describing another method of obtaining a second reference image list.

FIG. 30 is a diagram for describing another method of obtaining the second reference image list.

A first reference image list 3010 indicated by the indicator may include only short-term reference images. According to an embodiment, the first reference image list 3010 indicated by the indicator may include only long-term type reference images.

When the first reference image list 3010 includes only short-term type reference images, the obtainer 2010 may obtain, from the bitstream, POC-related values of long-term type reference images to be included in a second reference image list 3030, and may construct the second reference image list 3030 including the long-term type reference images indicated by the obtained POC-related values and the short-term type reference images included in the first reference image list 3010. That is, the first reference image list 3010 including only the short-term type reference images may be signaled through the sequence parameter set, and the POC-related values of the long-term type reference images may be signaled through the group header.

When the reference image lists are transmitted through the sequence parameter set rather than the group header, the reference image lists may not have to be transmitted for each block group, and thus, a compression rate may be improved due to reduction of an overhead. For example, when a prediction structure is repeated for each group of picture (GOP), the reference list may be repeatedly transmitted for each GOP. When the reference image lists which may be frequently transmitted are transmitted through the sequence parameter set, a bit rate may further be reduced.

Here, according to a type of the reference image, that is, whether the reference image is a long-term type or a short-term type, an availability with respect to the sequence parameter set may be different. While the short-term type reference image is related to a pattern in which the prediction structure is repeated as the example above, the long-term type reference image is highly related to correlation between a current picture and the long-term reference image. For example, when, although the prediction structure is repeated for each GOP, a long-term type reference image is not valid anymore because the content of an image is completely changed due to screen conversion, etc., a reference list with respect to short-term type reference images may be obtained from the sequence parameter set, and the long-term type reference image may be separately transmitted through the group header, so that transmission of the entire reference lists through the group header may be avoided.

According to an embodiment, when only the long-term type reference image is included in the first reference image list, the obtainer 2010 may obtain, from the bitstream, a POC-related value of the short-term type reference image to be included in the second reference image list, and may construct the second reference image list including the short-term type reference image indicated by the POC-related value and the long-term type reference image included in the first reference image list.

When constructing the second reference image list 3030, the reference images indicated by the POC-related value obtained from the group header of the bitstream may be assigned with higher indices or lower indices than the reference images included in the first reference image list 3010.

As described above, when the second reference image list is completely constructed, the prediction decoder 2050 may inter-predict the coding units based on the reference images included in the second reference image list. As a result of the inter-prediction, prediction samples corresponding to the coding units may be obtained.

The reconstructor 2070 obtains reconstruction samples of the coding units by using the prediction samples. According to an embodiment, the reconstructor 2070 may obtain the reconstruction samples of the coding units by adding residual data obtained from the bitstream to the prediction samples.

The reconstructor 2070 may perform luma mapping on the prediction samples of the coding units before obtaining the reconstruction samples.

Luma mapping is to change luma values of the prediction samples according to a parameter obtained from the bitstream, and for example, may correspond to a type of tone mapping.

According to an embodiment, the obtainer 2010 may obtain parameters for luma mapping from one or more post-processing parameter sets of the bitstream. Each of the one or more post-processing parameter sets may include parameters used for luma mapping or adaptive loop filtering to be described below.

The parameters used for luma mapping may include, for example, a range of luma values to be changed, a delta value to be applied to the luma value of the prediction samples, etc.

Figure 31:
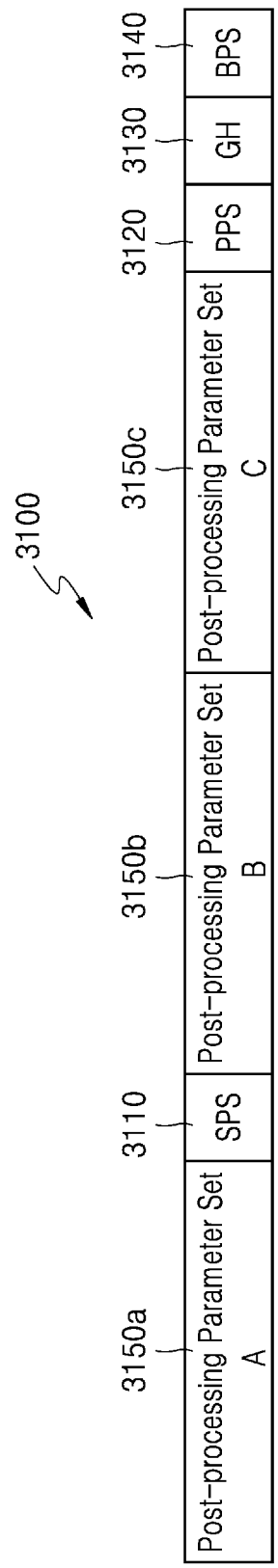
FIG. 31 is a diagram illustrating a bitstream including a plurality of post-processing parameter sets used for luma mapping or adaptive loop filtering.

FIG. 31 is a diagram illustrating a bitstream including a plurality of post-processing parameter sets used for luma mapping or adaptive loop filtering.

A bitstream 3100 may include, in addition to a sequence parameter set (SPS) 3110, a picture parameter set (PPS) 3120, a group header (GH) 3130, and a block parameter set (BPS) 3140, described above, a plurality of post-processing parameter sets 3150*a*, 3150*b*, and 3150*c*. The post-processing parameter sets 3150*a*, 3150*b*, and 3150*c* may be included in the bitstream regardless of a hierarchical structure of an image, unlike the SPS 3110, the PPS 3120, the GH 3130, and the BPS 3140.

An identifier may be assigned to each of the post-processing parameter sets 3150*a*, 3150*b*, and 3150*c*, in order to identify the same. According to an embodiment, identifiers 0, 1, and 2 may be assigned to post-processing parameter set A 3150*a*, post-processing parameter set B 3150*b*, and post-processing parameter set C 3150*c*, respectively.

One or more of the post-processing parameter sets 3150*a*, 3150*b*, and 3150*c* include the parameters used for luma mapping, and the others include the parameters used for adaptive loop filtering. For example, post-processing parameter set A and post-processing parameter set C may include the parameters used for luma mapping, and post-processing parameter set B may include the parameters used for adaptive loop filtering.

The obtainer 2010 may obtain, from the PPS 3120, the GH 3130, or the BPS 3140, an identifier indicating a post-processing parameter set from among the plurality of post-processing parameter sets 3150*a*, 3150*b*, and 3150*c*, the post-processing parameter set being used for luma mapping the prediction samples. The reconstructor 2070 may change the luma value of the prediction samples by using the parameters obtained from the post-processing parameter set indicated by the identifier.

When the obtainer 2010 obtains the identifier from the PPS 3120, the post-processing parameter set indicated by the identifier is used for the prediction samples derived in a current image, and when the obtainer 2010 obtains the identifier from the GH 3130, the post-processing parameter set indicated by the identifier is used for the prediction samples derived in a current slice. Also, when the obtainer 2010 obtains the identifier from the BPS 3140, the post-processing parameter set indicated by the identifier is used for the prediction samples derived in a current block.

According to an embodiment, the obtainer 2010 may obtain, from the bitstream, the identifier indicating any one of the plurality of post-processing parameter sets 3150*a*, 3150*b*, and 3150*c* and correction information. Here, the correction information may include information for changing the parameters included in the post-processing parameter set indicated by the identifier. For example, the correction information may include a difference value between a value of the parameter included in the post-processing parameter set indicated by the identifier and a value of a parameter to be changed.

The reconstructor 2070 may correct the parameters of the post-processing parameter set indicated by the identifier according to the correction information and may change the luma value of the prediction samples by using the corrected parameters.

According to another embodiment, the identifier obtained from the bitstream may indicate a plurality of post-processing parameter sets. In this case, the reconstructor 2070 may construct a new parameter set by combining one or more of the parameters included in each of the post-processing parameter sets indicated by the identifier, and may perform luma mapping on the prediction samples by using the newly constructed parameter set.

The reconstructor 2070 obtains reconstruction samples corresponding to the current coding unit by using the prediction samples generated as a result of prediction-decoding or the prediction samples on which luma mapping is performed. When the reconstruction samples are obtained, the reconstructor 2070 may apply adaptive loop filtering to the reconstruction samples.

Adaptive loop filtering denotes one-dimensional filtering performed on sample values of the reconstruction samples by using filter coefficients signaled through the bitstream. Adaptive loop filtering may be separately performed on the luma value and a chroma value. The filter coefficient may include a filter coefficient with respect to a one-dimensional filter. Each filter coefficient of the one-dimensional filter may be represented as a difference value between sequential filter coefficients, and the difference value may be signaled through the bitstream.

As described above, one or more of the post-processing parameter sets include the parameters used for luma mapping, and the others include the parameters (for example, the filter coefficients) used for adaptive loo filtering. For example, post-processing parameter set A 3150*a* and post-processing parameter set B 3150*b* may include the parameters used for adaptive loop filtering, and post-processing parameter set C 3150*c* may include the parameters used for luma mapping.

The obtainer 2010 may obtain, from the PPS 3120, the GH 3130, or the BPS 3140, an identifier indicating a post-processing parameter set from among the plurality of post-processing parameter sets 3150*a*, 3150*b*, and 3150*c*, the post-processing parameter set being used for adaptive loop filtering of the reconstruction samples. The reconstructor 2070 may filter the reconstruction samples by using the parameters obtained from the post-processing parameter set indicated by the identifier. When the obtainer 2010 obtains the identifier from the PPS, the post-processing parameter set indicated by the identifier is used for the reconstruction samples derived in the current image, and when the obtainer 2010 obtains the identifier from the GH, the post-processing parameter set indicated by the identifier is used for the reconstruction samples derived in the current slice. Also, when the obtainer 2010 obtains the identifier from the BPS, the post-processing parameter set indicated by the identifier is used for the reconstruction samples derived in the current block.

According to an embodiment, the obtainer 2010 may obtain, from the bitstream, the identifier indicating any one of the plurality of post-processing parameter sets 3150*a*, 3150*b*, and 3150*c* and correction information. Here, the correction information may include information for changing the filter coefficients included in the post-processing parameter set indicated by the identifier. For example, the correction information may include a difference value between a value of the filter coefficient included in the post-processing parameter set indicated by the identifier and a value of a filter coefficient to be changed.

The reconstructor 2070 may correct the filter coefficients of the post-processing parameter set indicated by the identifier according to the correction information and may filter the reconstruction samples by using the corrected filter coefficients.

According to another embodiment, the identifier obtained from the bitstream may indicate a plurality of post-processing parameter sets. In this case, the reconstructor 2070 may construct a new filter coefficient set by combining one or more of the filter coefficients included in each of the post-processing parameter sets indicated by the identifier, and may filter the reconstruction samples by using the newly constructed filter coefficient set.

According to another embodiment, when the identifier obtained from the bitstream indicates a plurality of post-processing parameter sets, the reconstruction 2070 may filter a luma value of the reconstruction samples by using the filter coefficients included in any one post-processing parameter set indicated by the identifier and may filter a chroma value of the reconstruction samples by using the filter coefficients included in another post-processing parameter set indicated by the identifier.

According to another embodiment, the obtainer 2010 may obtain, from the bitstream, an identifier indicating any one post-processing parameter set, and filter coefficient information. In this case, the reconstructor 2070 may combine one or more of filter coefficients included in post-processing parameter sets indicated by the identifier with a filter coefficient signaled through the bitstream and may filter the reconstruction samples by using a set of the combined filter coefficients.

According to an embodiment, the reconstructor 2070 may additionally perform deblocking filtering on the reconstruction samples on which adaptive loop filtering is performed.

As described above, the prediction decoder 2050 may decode the coding unit included in the current slice via inter-prediction. According to an embodiment, when the coding unit is decoded, a boundary of the current slice may be regarded as a picture boundary.

According to an embodiment, in a decoder-side motion vector refinement (DMVR) mode in which a decoder directly derives a motion vector of a coding unit, the prediction decoder 2050, when deriving a motion vector of a current coding unit, may limit a search range to a boundary of a region of a reference image, the region being at the same location as the current slice.

According to an embodiment, when a motion vector of a current coding unit signaled through the bitstream indicates a block outside the boundary of the region of the reference image, the region being at the same location as the current slice, the prediction samples may be obtained by padding the region at the same location as the current slice.

According to an embodiment, the prediction decoder 2050 may consider a boundary of a slice as a boundary of a picture in a bi-optical flow (BIO) processing mode and may prediction-decode the current coding unit. The BIO processing mode indicates a sample-wise motion vector improvement process performed with respect to block-wise motion compensation for bi-directional prediction.

When the obtainer 2010 performs entropy-coding on binary values included in the bitstream based on CABAC, the obtainer 2010 may selectively apply wave front parallel processing (WPP) by considering the number of tiles included in a slice. The WPP indicates processing of a current CTU after completion of processing of a CTU at an upper right side, for parallel encoding/decoding. In detail, the WPP configures a probability model of a first CTU at each row by using probability information obtained by processing a second CTU at an upper row.

When the slice includes only one tile, the obtainer 2010 may configure probability models with respect to CTUs included in the tile, based on the WPP, and when the slice includes a plurality of tiles, the obtainer 2010 may not apply the WPP to CTUs included in the tiles.

Figure 32:
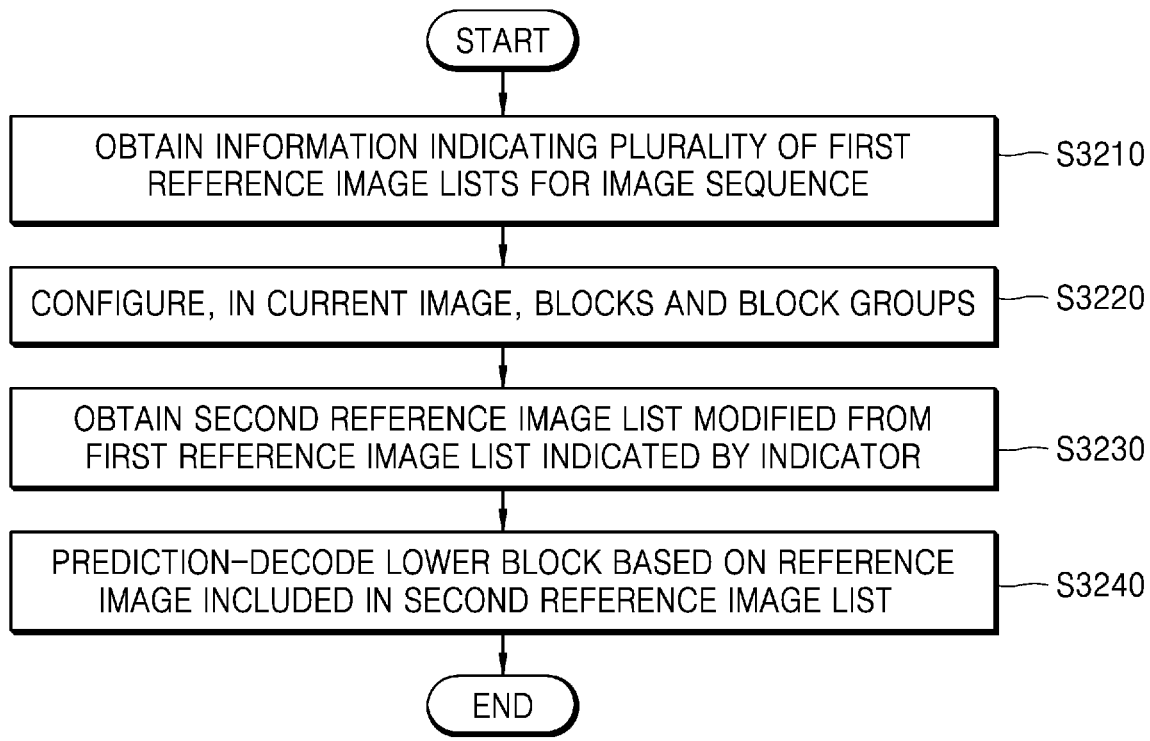
FIG. 32 is a diagram for describing an image decoding method according to an embodiment.

FIG. 32 is a diagram for describing an image decoding method according to an embodiment.

In operation S3210, the image decoding apparatus 2000 obtains, from an SPS of a bitstream, information indicating a plurality of first reference image lists for an image sequence including a current image. The plurality of first reference image lists may include at least one of a short-term type reference image and a long-term type reference image.

In operation S3220, the image decoding apparatus 2000 configures, in a current image, blocks and a block group including at least one block. The block may be a tile, and the block group may be a slice.

According to an embodiment, the image decoding apparatus 2000 may split the current image into a plurality of CTUs according to information obtained from the bitstream, and may configure, in the current image, a tile including at least one CTU and a slice including at least one tile.

According to an embodiment, the image decoding apparatus 2000 may split the current image into a plurality of tiles according to information obtained from the bitstream, and may split each tile into one or more CTUs. Also, the block determiner 2030 may configure, in the current image, a slice including at least one tile.

According to an embodiment, the image decoding apparatus 2000 may split the current image into one or more slices according to information obtained from the bitstream, and may split each slice into one or more tiles. Also, the block determiner 2030 may split each tile into one or more CTUs.

As described above, the image decoding apparatus 2000 may configure, in the current image, slices, according to address information obtained from the bitstream.

In operation S3230, the image decoding apparatus 2000 may obtain, from a GH of the bitstream, an indicator for a current block group including a current block in the current image, and may obtain a second reference image list based on a first reference image list obtained by the indicator. The image decoding apparatus 2000 may further obtain, from the bitstream, modification and refinement information for obtaining the second reference image list, together with the indicator. The modification and refinement information may include at least one of a POC-related value of a reference image to be removed from the first reference image list indicated by the indicator, a POC-related value of a reference image to be added to the second reference image list, a difference value between the POC-related value of the reference image to be removed from the first reference image list and the POC-related value of the reference image to be added to the second reference image list, and information for changing an order of images.

In operation S3240, the image decoding apparatus 2000 prediction-decodes a lower block of the current block based on a reference image included in the second reference image list.

When prediction samples corresponding to the lower block are obtained as a result of the prediction-decoding, the image decoding apparatus 2000 may specify a post-processing parameter set for luma mapping the prediction samples, according to an identifier indicating at least one of a plurality of post-processing parameter sets. Also, the image decoding apparatus 2000 may change a luma value of the prediction samples by using parameters included in the post-processing parameter set indicated by the identifier.

According to an embodiment, the image decoding apparatus 2000 may obtain reconstruction samples based on the prediction samples obtained as a result of the prediction-decoding or prediction samples on which luma mapping is performed and may perform adaptive loop filtering on the reconstruction samples. To this end, the image decoding apparatus 2000 may specify a post-processing parameter set for adaptive loop filtering, according to an identifier indicating at least one of the plurality of post-processing parameter sets. Also, the image decoding apparatus 2000 may filter the reconstruction samples by using the parameters included in the post-processing parameter set indicated by the identifier.

Figure 33:
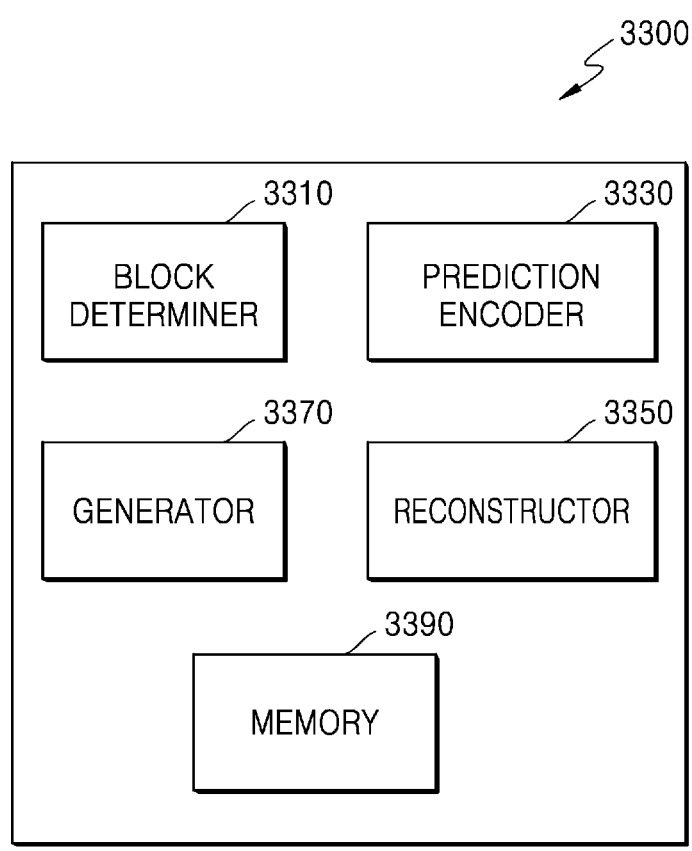
FIG. 33 is a diagram illustrating components of an image encoding apparatus according to an embodiment.

FIG. 33 is a diagram illustrating components of the image encoding apparatus 3300, according to an embodiment.

Referring to FIG. 33, the image encoding apparatus 3300 includes a block determiner 3310, a prediction encoder 3330, a reconstructor 3350, and a generator 3370. The generator 3370 illustrated in FIG. 33 may correspond to the bitstream generator 210 illustrated in FIG. 2, and the block determiner 3310, the prediction decoder 3330, and the reconstructor 3350 may correspond to the encoder 220 illustrated in FIG. 2.

The block determiner 3310, the prediction encoder 3330, the reconstructor 3350, and the generator 3370 according to an embodiment may be realized as at least one processor. The image encoding apparatus 3300 may include at least one memory 3390 storing input and output data of the block determiner 3310, the prediction encoder 3330, the reconstructor 3350, and the generator 3370. Also, the image encoding apparatus 3300 may include a memory controller controlling data inputting and outputting of the memory 3390.

The block determiner 3310 may split a current image into blocks and may configure, in the current image, block groups including at least one block. Here, the block may correspond to a tile, and the block group may correspond to a slice. The slice may be referred to as a tile group.

As described with reference to FIGS. 3 through 16, the block determiner 3310 may determine a transform unit, a coding unit, a CTU, a tile, a slice, etc. by splitting the current image.

According to an embodiment, the block determiner 3310 may split the current image into a plurality of CTTUs and may configure, in the current image, a tile including at least one CTU and a slice including at least one tile.

According to an embodiment, the block determiner 3310 may split the current image into a plurality of tiles and may split each tile into one or more CTUs. Also, the block determiner 3310 may configure, in the current image, a slice including at least one tile.

According to an embodiment, the block determiner 3310 may split the current image into one or more slices and may split each slice into one or more tiles. Also, the block determiner 3310 may split each tile into one or more CTUs.

The prediction encoder 3330 inter-predicts or intra-predicts lower blocks of the blocks split from the current image to obtain prediction samples corresponding to the lower blocks. Here, the lower block may be at least one of a CTU, a coding unit, and a transform unit.

The prediction encoder 3300 may prediction-encode coding units through inter-prediction or intra-prediction. According to inter-prediction, a prediction sample of a current coding unit may be obtained based on a reference block in a reference image indicated by a motion vector, and residual data corresponding to a difference between the prediction sample and the current coding unit may be transmitted to the image decoding apparatus 2000 through a bitstream. According to a prediction mode, residual data may not be included in the bitstream.

Hereinafter, a method of constructing a reference image list used for inter-prediction is described.

According to an embodiment, the prediction encoder 3330 may construct a plurality of first reference image lists for an image sequence including a current image. The prediction encoder 3330 selects at least one of the plurality of first reference image lists used for the image sequence. The prediction encoder 3330 may select a first reference image list used for a current slice from among the plurality of first reference image lists. Also, the prediction encoder 3330 obtains a second reference image list modified and refined from the selected first reference image list.

The second reference image list may be obtained by substituting at least one of reference images included in the first reference image list by another reference image, by changing an order of one or more of the reference images, or by adding a new reference image to the first reference image list.

When the second reference image list is obtained, the prediction encoder 3330 may encode the coding units included in the slice through inter-prediction by using at least one of reference images included in the second reference image list.

The prediction encoder 3300 may prediction-encode coding units included in a next slice by using a first reference image list other than the first reference image list selected for the current slice from among the plurality of first reference image lists used for the image sequence, and the second reference image list. In other words, the second reference image list obtained for the current slice may also be used for the next slice.

Hereinafter, a method of obtaining the second reference image list modified and refined from the first reference image list is described.

According to an embodiment, the prediction encoder 3330 may obtain the second reference image list by changing at least one of reference images included in the first reference image list by another reference image.

According to an embodiment, the prediction encoder 3330 may replace only a particular type of reference image from among the reference images included in the first reference image, for example, a long-term type reference image, by another long-term type reference image. That is, a short-term type reference image from among the reference images included in the first reference image list may be intactly maintained in the second reference image list, and only the long-term type reference image may be replaced by another long-term type reference image.

According to an embodiment, regardless of a type of the reference images included in the first reference image list, at least one of the reference images included in the first reference image list may be replaced by another reference image. According to an embodiment, a new reference image may be added to the second reference image list according to the order of a reference image to be removed from the first reference image list. That is, when a long-term type reference image assigned with an index of 1 is removed from the first reference image list, the new reference image may also be assigned with the index of 1.

According to an embodiment, the prediction encoder 3330 may obtain the second reference image list by excluding particular types of reference images from among the reference images in the first reference image list selected for the current slice from among the plurality of first reference image lists for the image sequence.

According to an embodiment, the prediction encoder 3330 may obtain the second reference image list by changing an order of one or more reference images from among the reference images in the first reference image list selected for the current slice from among the plurality of first reference image lists for the image sequence.

According to an embodiment, the prediction encoder 3330 may obtain the second reference image list by using a first reference image list including only short-term type reference images and a first reference image list including only long-term type reference images. For example, the prediction encoder 3330 may include, in the second reference image list, the short-term type reference images included in the first reference image list and the long-term type reference images included in the first reference image list.

Also, according to an embodiment, when the first reference image list includes only a short-term type reference image, the prediction encoder 3330 may obtain the second reference image list including the short-term type reference image included in the first reference image list and a new long-term type reference image. In contrast, when the first reference image list includes only a long-term type reference image, the prediction encoder 3330 may obtain the second reference image list including the long-term type reference image included in the first reference image list and a new short-term type reference image.

When the construction of the second reference image list is completed, the prediction encoder 3330 may inter-predict the coding units based on the reference image included in the second reference image list. As a result of the inter-prediction, prediction samples corresponding to the coding units may be obtained.

The reconstructor 3350 obtains reconstruction samples of the coding units by using the prediction samples. A reconstructed image including the reconstruction samples may be stored in a DPB as a reference image for a subsequent image.

According to an embodiment, the reconstructor 3350 may perform luma mapping on the prediction samples of the coding units before obtaining the reconstruction samples. The reconstructor 3350 may obtain parameters for luma mapping from a plurality of post-processing parameter sets.

Each of the plurality of post-processing parameter sets may include parameters used for luma mapping or adaptive loop filtering to be described below. In other words, some of the post-processing parameter sets include the parameters used for luma mapping, and the others include the parameters used for adaptive loop filtering. For example, at least one parameter set may include the parameters used for luma mapping, and the other parameter sets may include the parameters used for adaptive loop filtering. The reconstructor 3350 may generate the plurality of post-processing parameter sets including the parameters used for luma mapping or the parameters used for adaptive loop filtering. As described above, the plurality of post-processing parameter sets may be signaled to the image decoding apparatus 2000 through the bitstream.

The reconstructor 3350 may obtain the parameters from a post-processing parameter set selected from among the plurality of post-processing parameter sets and may change a luma value of the prediction samples by using the obtained parameters.

According to an embodiment, the reconstructor 3350 may correct the parameters of the post-processing parameter set selected from among the plurality of post-processing parameter sets and may change the luma value of the prediction samples by the corrected parameters.

Also, according to an embodiment, the reconstructor 3350 may construct a new parameter set by combining one or more of the parameters included in at least two post-processing parameter sets from among the plurality of post-processing parameter sets and may change the luma value of the prediction samples by using the parameters of the newly constructed parameter set.

The reconstructor 3350 obtains the reconstruction samples corresponding to the current coding unit by using the prediction samples generated as a result of prediction-decoding or the prediction samples on which luma mapping is performed. When the reconstruction samples are obtained, the reconstructor 3350 may apply adaptive loop filtering to the reconstruction samples.

As described above, some of the post-processing parameter sets may include the parameters used for luma mapping, and the others may include the parameters (for example, filter coefficients) used for adaptive loop filtering. The reconstructor 3350 may filter the reconstruction samples by using the parameters obtained from at least one of the plurality of post-processing parameter sets.

According to an embodiment, the reconstructor 3350 may correct the parameters obtained from any one of the plurality of post-processing parameter sets and may filter the reconstruction samples by using the corrected parameters.

Also, according to an embodiment, the reconstructor 3350 may construct a new parameter set by combining one or more of the parameters included in at least two post-processing parameter sets from among the plurality of post-processing parameter sets and may filter the reconstruction samples by using the parameters of the newly constructed parameter set.

Also, according to an embodiment, the reconstructor 3350 may filter a luma value of the reconstruction samples by using any one post-processing parameter set from among the plurality of post-processing parameter sets and may filter a chroma value of the reconstruction samples by using another post-processing parameter set.

When the prediction encoder 3330 inter-predicts the coding unit included in the current slice, the prediction encoder 3330 may consider a boundary of the current slice as a picture boundary.

When the prediction encoder 3330 derives a motion vector of the current coding unit, the prediction encoder 3330 may limit a search range to a boundary of a region of a reference image, the region being at the same location as the current slice.

According to an embodiment, the prediction encoder 3330 may consider a boundary of a slice as a boundary of a picture in a BIO processing mode and may prediction-encode the current coding unit.

The generator 3370 generates a bitstream including information used for encoding an image. As described above, the bitstream may include a SPS, a PPS, a GH, a BPS, and at least one post-processing parameter set.

The information included in the bitstream generated by the generator 3370 is described above with respect to the image decoding apparatus 2000, and thus, its detailed description is omitted.

The generator 3370 may entropy-code binary values corresponding to syntax elements based on CABAC. Here, the generator 3370 may selectively apply WPP by considering the number of tiles included in the slice. When the slice includes only one tile, the generator 3370 may configure probability models with respect to CTUs included in the tile, based on the WPP, and when the slice includes a plurality of tiles, the generator 3370 may not apply the WPP to CTUs included in the tiles.

Figure 34:
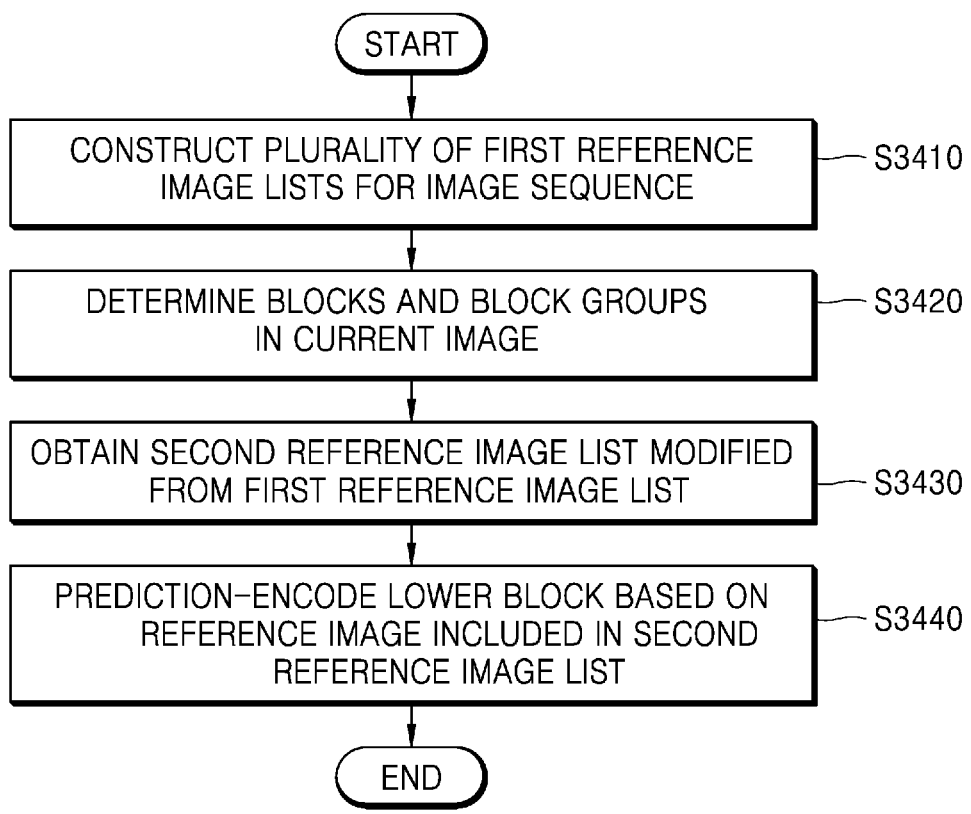
FIG. 34 is a diagram for describing an image encoding method according to an embodiment.

FIG. 34 is a diagram for describing an image encoding method according to an embodiment.

In operation S3410, the image encoding apparatus 3300 constructs a plurality of first reference image lists for an image sequence including a current image. The plurality of first reference image lists may include at least one of a short-term type reference image and a long-term type reference image.

In operation S3420, the image encoding apparatus 3300 configures, in a current image, blocks and a block group including at least one block. The block may be a tile, and the block group may be a slice.

According to an embodiment, the image encoding apparatus 3300 may split the current image into a plurality of CTUs and may configure, in the current image, a tile including at least one CTU and a slice including at least one tile.

According to an embodiment, the image encoding apparatus 3300 may split the current image into a plurality of tiles and may split each tile into one or more CTUs. Also, the image encoding apparatus 3300 may configure, in the current image, a slice including at least one tile.

According to an embodiment, the image encoding apparatus 3300 may split the current image into one or more slices and may split each slice into one or more tiles. Also, the image encoding apparatus 3300 may split each tile into one or more CTUs.

In operation S3430, the image encoding apparatus 3300 may select a first reference image list for a current block group including a current block in a current image from among a plurality of first reference image lists and may obtain a second reference image list based on the selected first reference image list.

In operation S3440, the image encoding apparatus 3300 prediction-decodes a lower block included in the current block based on a reference image included in the second reference image list.

When prediction samples corresponding to the lower block are obtained as a result of the prediction-encoding, the image encoding apparatus 3300 may change a luma value of the prediction samples by using parameters included in at least one of a plurality of post-processing parameter sets.

According to an embodiment, the image encoding apparatus 3300 may obtain reconstruction samples based on the prediction samples obtained as a result of the prediction-encoding or prediction samples on which luma mapping is performed and may perform adaptive loop filtering on the reconstruction samples. To this end, the image encoding apparatus 3300 may filter the reconstruction samples by using the parameters included in at least one of the plurality of post-processing parameter sets.

Meanwhile, the embodiments of the present disclosure described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the media include recording media and storage media managed by application stores distributing applications or by websites, servers, and the like supplying or distributing other various types of software.

While one or more embodiments of the present disclosure have been described with reference to the figures, it will be understood by those of ordinary skill in the art that various changes in form and details may be made therein without departing from the spirit and scope as defined by the following claims.

The invention claimed is:

1. An image decoding method comprising:
obtaining, from a sequence parameter set of a bitstream, information about a plurality of first reference picture lists for a picture sequence including a current picture;
obtaining, from a slice header of the bitstream, an indicator for a current slice in the current picture;
if a first reference picture list indicated by the indicator among the plurality of first reference picture lists does not include a picture order count (POC)-related information about a long-term type reference picture, obtaining the POC-related information about the long-term type reference picture from the slice header of the bitstream;
constituting a second reference picture list by using the POC-related information about the long-term type reference picture and a POC-related information about a short-term type reference picture included in the first reference picture list indicated by the indicator;
obtaining a predicted sample of a current sample included in the current picture based on a reference picture included in the second reference picture list;
obtaining information indicating a post-processing parameter set from among a plurality of post-processing parameter sets, the post-processing parameter set being applied to luma mapping for the current picture;
obtaining one or more luma mapping parameters from the post-processing parameter set of the bitstream, the post-processing parameter set being different from the sequence parameter set;
obtaining a modified predicted sample by changing the predicted sample based on the one or more luma mapping parameters obtained from the post-processing parameter set; and
obtaining a reconstructed sample of the current sample included the current picture based on the modified predicted sample.

2. An image decoding apparatus comprising:
a processor is configured to:
obtain, from a sequence parameter set of a bitstream, information about a plurality of first reference picture lists for a picture sequence including a current picture;
obtain, from a slice header of the bitstream, an indicator for a current slice in the current picture;
if a first reference picture list indicated by the indicator among the plurality of first reference picture lists does not include a picture order count (POC)-related information about a long-term type reference picture, obtain the POC-related information about the long-term type reference picture from the slice header of the bitstream;
constitute a second reference picture list by using the POC-related information about the long-term type reference picture and a POC-related information about a short-term type reference picture included in the first reference picture list indicated by the indicator;
obtain a predicted sample of a current sample included in the current picture based on a reference picture included in the second reference picture list,
obtain information indicating a post-processing parameter set from among a plurality of post-processing parameter sets, the post-processing parameter set being applied to luma mapping for the current picture;

obtain one or more luma mapping parameters from the post-processing parameter set of the bitstream, the post-processing parameter set being different from the sequence parameter set;

obtain a modified predicted sample by changing the predicted sample based on the one or more luma mapping parameters obtained from the post-processing parameter set; and obtain a reconstructed sample of the current sample included the current picture based on the modified predicted sample.

3. An image encoding method comprising:

determining a plurality of first reference picture lists for a picture sequence including a current picture;

selecting, from among the plurality of first reference picture lists, a first reference picture list for a current slice in the current picture;

if the selected first reference picture list among the plurality of first reference picture lists does not include a picture order count (POC)-related information about a long-term type reference picture, determining the POC-related information about the long-term type reference picture;

constituting a second reference picture list by using the POC-related information about the long-term type reference picture and a POC-related information about a short-term type reference picture included in the selected first reference picture list; and obtaining a predicted sample of a current sample included in the current picture based on a reference picture included in the second reference picture list;

selecting a post-processing parameter set from among a plurality of post-processing parameter sets, the post-processing parameter set being applied to luma mapping for the current picture;

identifying one or more luma mapping parameters corresponding to the post-processing parameter set, the post-processing parameter set being different from the sequence parameter set;

encoding information about the plurality of first reference picture lists for the picture sequence including the current picture, an indicator for the current slice in the current picture, the POC-related information about the long-term type reference picture, and the one or more luma mapping parameters; and generating a bitstream including the encoded information, the encoded indicator, the encoded POC-related information, and the encoded one or more luma mapping parameters.

4. A method for transmitting a bitstream, the method comprising:

determining a plurality of first reference picture lists for a picture sequence including a current picture;

selecting, from among the plurality of first reference picture lists, a first reference picture list for a current slice in the current picture;

if the selected first reference picture list among the plurality of first reference picture lists does not include a picture order count (POC)-related information about a long-term type reference picture, determining the POC-related information about the long-term type reference picture;

constituting a second reference picture list by using the POC-related information about the long-term type reference picture and a POC-related information about a short-term type reference picture included in the selected first reference picture list; and obtaining a predicted sample of a current sample included in the current picture based on a reference picture included in the second reference picture list;

selecting a post-processing parameter set from among a plurality of post-processing parameter sets, the post-processing parameter set being applied to luma mapping for the current picture;

identifying one or more luma mapping parameters corresponding to the post-processing parameter set, the post-processing parameter set is different from the sequence parameter set;

encoding information about the plurality of first reference picture lists for the picture sequence including the current picture, an indicator for the current slice in the current picture, the POC-related information about the long-term type reference picture, and the one or more luma mapping parameters;

generating the bitstream including the encoded information, the encoded indicator, the encoded POC-related information, and the encoded one or more luma mapping parameters; and transmitting the bitstream from an image encoding apparatus to an image decoding apparatus.

* * * * *